United States Patent [19]

Suzuoka

[11] Patent Number: 6,092,097
[45] Date of Patent: Jul. 18, 2000

[54] PARALLEL PROCESSING SYSTEM WITH EFFICIENT DATA PREFETCH AND COMPILATION SCHEME

[75] Inventor: Takashi Suzuoka, Pittsburgh, Pa.

[73] Assignee: Kabushiki Kaisha Toshiba, Kawasaki, Japan

[21] Appl. No.: 08/592,612

[22] Filed: Jan. 26, 1996

Related U.S. Application Data

[63] Continuation of application No. 08/212,860, Mar. 14, 1994, abandoned.

[30] Foreign Application Priority Data

Mar. 12, 1993 [JP] Japan .................................. 5-052744

[51] Int. Cl.[7] .............................. G06F 15/16; G06F 9/45
[52] U.S. Cl. ............................. 709/201; 712/28; 395/706
[58] Field of Search ........................ 395/800.28, 800.25, 395/200.31, 702, 705–710, 670; 707/10; 711/148, 153; 709/201–203, 305, 208, 2, 7; 712/28, 216

[56] References Cited

U.S. PATENT DOCUMENTS

| | | | |
|---|---|---|---|
| 4,980,824 | 12/1990 | Tulpule et al. .............................. | 709/7 |
| 5,021,945 | 6/1991 | Morrison et al. ........................... | 709/3 |
| 5,095,522 | 3/1992 | Fujita et al. .............................. | 709/303 |
| 5,179,702 | 1/1993 | Spix et al. ............................... | 711/173 |
| 5,329,630 | 7/1994 | Baldwin ................................. | 712/216 |
| 5,485,612 | 1/1996 | Ota et al. ..................................... | 709/1 |

FOREIGN PATENT DOCUMENTS

| | | |
|---|---|---|
| 62-274451 | 11/1987 | Japan . |
| 4-44181 | 2/1992 | Japan . |

OTHER PUBLICATIONS

Workstation Cooperation Through a Typed Distributed Shared Memory Abstraction Technical Report 92–1, Feb. 1992, Distributed Computing Research Lab. Dept. of Computer Science and Engineering, Univ. of Notre Dame, Notre Dame Indiana 46556.

Basing Microkernel Abstractions on High–Level Language Models—Technical Report 92–2, Mar. 1992—Revised Jul. 1992—David L. Cohn, Arindam Banerji, Michael R. Casey, Paul M. Greenawalt, Dinesh C. Kulkarni—Distributed Computing Research Lab. Dept. of Computer Science and Engineering.

Arcade: A Platform for Heterogeneous Distributed Operating Systems—Proceedings of the 1989 USENIX Workshop on Experience with Distributed and Multipcoressor Systems; Oct. 1989.

Unifying Kernel–Level and Language–Level Approaches to Distributed Shared Data—Technical Report 89–11–1—Nov. 1989—William P. Delaney, Karen M. Tracey, David L. Cohn—Dept. of Electrical and Computer Engineering University of Notre Dame, Notre Dame, Indiana 46556.

(List continued on next page.)

*Primary Examiner*—John A. Follansbee
*Attorney, Agent, or Firm*—Foley & Lardner

[57] ABSTRACT

A parallel processing system capable of facilitating the data prefetch in the parallel computer and realizing a compilation scheme capable of removing the overhead caused by the control codes due to the parallelism. In the system, data dependency of each operation in the program is analyzed. Then, according to the data dependency, each processor recognizes those processors which have possibilities to require data allocated to the distributed part of the distributed shared memory in each processor, and each processor transmits the data to these processors before these processors actually require the data. The system has a host side compiler for compiling each program such that parallel processing independent portions of the program are compiled up to object-codes, while leaving parallel processing dependent portions of the program as intermediate-codes, and a node side compiler at each processor for optimally compiling the object-codes and the intermediate-codes obtained by the host side compiler to obtain optimum execution codes, according to information concerning parallelism.

18 Claims, 26 Drawing Sheets

OTHER PUBLICATIONS

High–Performance Implicit Communication in a Distributed System—Technical Report 1–7–90—Jul. 1990—William P. Delaney, David L. Cohn, Karen M. Tracey, Dept. of Electrical and Computer Engineering, Univ. of Notre Dame.

Data Units: A Process Interaction Paradigm—Technical Report 91–3—Mar. 1991—William P. Delaney, David L. Cohn, Karen M. Tracey and Michael R. Casey.

Using Kernel–Level Support for Distributed Shared Data—Proceedings of 1991 USENIX Workshop on Experience with Distributed Multiprocessor Systems; Mar. 1991—David L. Cohn, Paul M. Greenawalt, Michael R. Casey, Matthew P. Stevenson—Dept. of Computer Science & Engineering—Univ. of Notre Dame.

Arcade: An Architectural Basis for Distributed Computing—Technical Report 92–3—Mar. 1992—A. Banerji, M.R. Casey, D.L. Cohn, P.M. Greenawalt, D.C. Kulkarni, J.E. Saldanha, J.M. Tracey, Dept. of Computer Science & Engineering—Univ. of Notre Dame—IN 46556.

A New Approach to the Design of Distributed Operating Systems—Technical Report 92–5—Apr. 1992—Revised Aug. 1992—Dinesh C. Kulkarni, Arindam Banerji, David L. Cohn—Dept. of Computer Science and Engineering Univ. of Notre Dame—IN 46556.

Making Distributed Computing Accessible to the Application Programmer Technical Report 92–6—Apr. 1992—D.L. Cohn, A. Banerji, D.C. Kulkarni, M.R. Casey, P.M. Greenawalt, Dept. of Computer Science and Engineering, Univ. of Notre Dame—IN 46556.

Structung Distributed Shared Memory with Pi Architecture—Technical Report 92–9, Oct. 1992—Dinesh C. Kulkarni, Arindam Banerji, Michael R. Casey David L. Cohn, Distributed Computing Research Lab—UNiversity of Notre Dame, IB 46556.

Distribution and Persistence: Natural Outgrowths of the Arcade Data Model—May 1992, Rev. Jul. 1992—D.C. Kulkarni, M.R. Casey, D.L. Cohn—Dept. of Computer Science and Engineering Univ. of Notre Dame—IN 46556—Technical Report 92–8.

IEEE Computer, vol. 23, No. 4, Apr. 1990, R.D. Rettberg, et al., "The Monarch Parallel Processor Hardware Design", pp. 18–28.

ACM Sigplan Notices, vol. 27, No. 9, Sep. 1992, Ann Rogers, et al., "Software Support for Speculative Loads", pp. 38–50.

Communications of the ACM, Aug. 1992, vol. 35, No. 8, Seema Hiranandani, et al., "Compiling Fortran D for Mind Distributed–Memory Machines", pp. 66–80.

ICOT Journal, No. 23, Jul. 1990, Koichi Furukawa, et al., Research Report "On Partial Evaluation", pp. 4–15.

ACM Sigplan Notices, vol. 26, No. 9, Sep. 1991, "Techniques for Partial Evaluation of Imperative Languages", Uwe Meyer, pp. 94–105.

FIG.3A
PRIOR ART

```
X = 10
IF (X. GT. 0) THEN
    Y = X
ELSE
    Y = -X
ENDIF
```

```
program power ;
begin declare N, ⌀X,Y=1 ;
      read(N) ;    read(X) ;
      while N > 0 do
            while N mod 2=0 do N:=N/2;  x:=X*X
               N:=N-1;  Y:=Y*X
      end ;
      write(Y)
end .
```

FIG.4B
PRIOR ART

```
program power ;
begin declare X, Y ;
      read(X) ;
      Y:=X;  X:=X*X;  Y:=Y*X;
      write(Y)
end .
```

FIG.5A
PRIOR ART

PROGRAM EX
DIMENSION A(16)
. . .
READ(5, *) M1, M2
. . .
DO 1, I=M1, M2
1 A(I) = I
. . .
END

FIG.5B
PRIOR ART

C   #PREEXEC START
    PROGRAM EX
    DIMENSION A(16)
    . . .
    READ(5, *) M1, M2
C   #PREEXEC END
    . . .
    DO 1, I=M1, M2
1 A(I) = I
    . . .
    END

FIG.6A
PRIOR ART

SUBROUTINE PEX(M1, M2)
DIMENSION PA(4)
. . .
MYPE = MYPENUM()
N1 = (M1−1)/4+1
IF (MOD(M1−1, 4).GE. MYPE) N1=N1+1
N2 = (M2−1)/4+1
IF (MOD(M2−1, 4).GE. MYPE) N2=N2+1
DO 1, J=N1, N2, 1
1 PA(J)=(J+1)*4+MYPE
. . .
RETURN
END

FIG.6B
PRIOR ART

SUBROUTINE PEX(M1, M2)
DIMENSION PA(4)
. . .
MYPE = MYPENUM()
DO 1, J=1, 4, 1
1 PA(J)=(J−1)*4+MYPE
. . .
RETURN
END

FIG.8
PRIOR ART

```
REAL A(100, 100), B(100, 100)
DECOMPOSITION D(100, 100)
ALIGN A, B WITH D
DISTRIBUTE D(:, BLOCK)
do k = 1, time
    do j = 2, 99
        do i = 2, 99
            A(i, j) = (B(i, j-1)+B(i-1, j)+B(i+1, j)+B(1, j+1))/4
        enddo
    enddo
    do j = 2, 99
        do i = 2, 99
            B(i, j) = A(i, j)
        enddo
    enddo
enddo
```

FIG.9
PRIOR ART

```
REAL A (100, 25), B (100, 0 : 26)
if (Plocal = 1) lbl =2 else lbl = 1
if (Plocal = 4) ubl = 24 else ubl = 25
do k = 1, time
    if (Plocal > 1) send(B(2 : 99, 1), Pleft)
    if (Plocal < 4) send(B(2 : 99, 25), Pright)
    if (Plocal < 4) recv(B(2 : 99, 26), Pright)
    if (Plocal > 1) recv(B(2 : 99, 0), Pleft)
    do j = 2, 99
        do i = 2, 99
            A(i, j) = (B(i, j-1)+B(i-1, j)+B(i+1, j)+B(i, j+1))/4
        enddo
    enddo
    do j= 2 , 99
        do i=2, 99
            B(i, j) = A(i, j)
        enddo
    enddo
enddo
```

FIG.10
PRIOR ART

DATA ID 300

| PROCESSOR NO. (300A) | PROCESSOR INTERNAL NO. (300B) |
|---|---|
|  |  |

FIG.18

PROGRAM :

double x[N] ;

function (int n, double x[]) {
      double old_ x[N], dif ;
      int i ;
      do {
          for all (i=1 ; i<n-1 ; ++i) old_ x[i]=x[i] ;
          for all (i=1, dif=0 ; i<n-1 ; ++i) {
              double v ;
              x[i] = COEF * (old_x[i-1] = old_x[i] + old_x[i+1]) ;
              v = x[i] - old_x[i] ;
              dif += v*v ;

}
      } while (dif >= EPSILON) ;
  }

FIG.19A

```
1   #define UNDEF -1
2   double x[2][N] ;
3
4   function(int n, double x[], doule x_old[]) {
5       int iterate, gsum ;
6       static int flagWL, flagWR ;
7       static int flagRL, flagRR ;
8
9       sync(REQUEST) ;
10      iterate = (n+PE_NUM-1)/PE_NUM ;
11      if(pe_id==PE_NUM-1)iterate = n-iterate*(PE_NUM-1) ;
12      sync(WAIT) ;
13
14      flagWL = flagWR = 0 ;
15      if (pe_id>0) {
16          x[iterate+1]@(pe_id-1)=x[1] ;
17          flagRR@(pe_id-1)=1 ;
18      } else {
19          flagRR = 1 :
20      }
21      if (pe_id < PE_NUM-1) {
22          X[0]@(pe_id+1)=x[iterate] ;
23          flagRL@(pe_id+1)=1 ;
24      } else {
25          flagRL=1 ;
26      }
27
28      do {
29          int i ;
30          double dif ;
31
32          while( !flagRL)   ;
33          while( !flagRR)   ;
34          {double *temp ; temp=x ; x=x_old ; x_old=temp ;}
35          for (i=1 ; i<=iterate ; ++i) {
```

FIG.19B

```
36          double v ;
37          x[i] = COEF*(x_old[i-1]+x_old[i]+x_old[i+1]) ;
38          v = x[x]-x_old[x] ;
39          dif += v*v ;
40        }
41        gsum = UNDEF ;
42        async_gsum(&gsum, dif) ;
43        flagRL = flagRR = 0 ;
44        if(pe_id > 0 ) flagWR@(pe_id-1) = 1 ;
45        if(pe_id < PE_NUM) flagWL@(pe_id+1) =1 ;
46
47        for ( ; ; ) {
48           if (flagWL) {
49              x[iterate+1]@(pe_id-1) = x[1] ;
50              flagRL@(pe_id-1) = 1 ;
51              if (pe_id < PE_NUM-1) {
52                 while ( !flagWR) ;
53                 x[0]@(pe_id+1) = x[iterate] ;
54                 flagRR@(pe_od+1) = 1 ;
55              }
56              break ;
57           } else if (flagWR) {
58              x[0]@(pe_id+1) = x[iterate] ;
59              flagRR@(pe_id+1) = 1 ;
60              if (pe_id > 0) {
61                 while ( !flagWL) ;
62                 x[iterate+1]@(pe_id-1 = x[1] ;
63                 flagRL@(pe_id-1) = 1 ;
64              }
65              break ;
66           }
67        }
68        while (gsum==UNDEF) ;
69     } while (gsum >= EPSILON) ;
70   }
```

WL : Write Laft    RR : Read Right
RL : Read Left     WR : Write Right

CALL SIDE :
    function (N, x[0], x[1]) ;

FIG.22

PROGRAM :

double x[N] ;

```
function(int n, double x[]) {
    double old_x[N], dif ;
    int i ;

do {
        for all(i=1 ; i<n-1 ; ++i) old_x[i]=x[i] ;
        for all(i=1, dif=0 ; i<n-1 ; ++i) {
            double v ;
            if(i==0) {
                x[0]=COEF*(old_x[n-1]+old_x[0]+old_x[1]) ;
            } else if(i==n-1) {
                x[n-1]=COEF*(old_x[n-2]+old_x[n-1]+old_x[0]) ;
            } else {
                x[i]=COEF*(old_x[i-1]+old_x[i]+old_x[i+1]) ;
            }
            v=x[i]-old_x[i] ;
            dif += v*v ;
        }
    } while(dif>=EPSILON) ;
}
```

FIG.24

FLAG :

| PROCESSOR-(i-1) | PROCESSOR-i | PROCESSOR-(i+1) |
|---|---|---|
| flagRR[0] ← | | → flagRL[0] |
| flagRR[1] ← | | → flagRL[1] |
| → | flagRL[0]   flagRR[0] | ← |
| → | flagRL[1]   flagRR[1] | ← |

RL : Read Left    RR : Read Right

CALL SIDE :
    function(N, x[0], x[1]) ;

FIG.23

```
1   PROGRAM:
2
3     #define UNDEF -1
4     double x[2][N] ;
5
6     function(int n, double x[], double x_old[]) {
7         int iterate, gsum, pe, phase=0 ;
8         static int flagRL[2], flagRR[2] ;
9
10        sync(REQUEST) ;
11        iterate = (n+PE_NUM-1)/PE_NUM ;
12        if (pe_id==PE_NUM-1) iterate = n-iterate*(PE_NUM-1) ;
13        sync(WAIT) ;
14
15        pe = (pe_id > 0)? pe_id-1 : PE_NUM-1 ;
16        x[iterate+1]@(pe)=x[1] ;
17        flagRR@[phase]@(pe)=1 ;
18
19        pe=(pe_id < PE_NUM-1)? pe_id+1 : 0 ;
20        x[0]@(pe)= x[iterate] ;
21        flagRL[phase]@(pe)=1 ;
22
23        do {
24            int i ;
25            double dif ;
26
27            while ( !flagRL[phase]) ;
28            while ( !flagRR[phase]) ;
29            {double *temp ; temp = x ; x = x_old ; x_old=temp ;}
30            for (i=1 ; i <=iterate ; ++i) {
31                double v ;
32                x[i]=COEF*(x_old[i-1]+x_old[i]+x_old[i+1]) ;
33                v=x[x]-x_old[x] ;
34                dif += v*v ;
35            }
36            gsum =UNDEF ;
37            async_gsum(&gsum, dif) ;
38            flagRL[phase]=flagRR[phase] = 0 ;
39            phase = 1-phase ;
40
41            pe = (pe_id > 0) ? pe_id-1 : PE_NUM-1 ;
42            x[iterate+1]@(pe)=x[1] ;
43            flagRR[phase]@(pe) = 1 ;
44
45            pe = (pe_id < PE_NUM-1)? pe_id+1 : 0 ;
46            x[0]@(pe) = x[iterate] ;
47            flagRL[phase]@(pe)=1 ;
48
49            while (gsum==UNDEF) ;
50        } while (gsum >= EPSILON) ;
51    }
52
53
```

FIG.25

```
         DO 40, I=1, MAX
            DO ALL 10, J=I, N
10             Y(J)=X(J)
            DO ALL 20, J=I, N
               IF (J, LT, N) THEN
                  X(J)=0.5*(Y(J)+Y(J+1))
               ELSE
                  X(N)=0.5*(Y(N)+(1))
               ENDIF
20          CONTINUE
            DIFF=0
            DO 30, J=I, N
30             DIFF=DIFF+ABS(X(J)-Y(J))
            IF (DIFF, LE, EPSILON) GOTO 50
40       CONTINUE
50   ...
```

FIG.26

```
         DO 40, I=1, MAX
            UPDATE(X)
            DO ALL 20, J=I, N
10             IF (J, LT, N) THEN
                  X(J)=0.5*(X'(J)+(J+1))
               ELSE
                  X(N)=0.5*(X'(N)+X'(0))
               ENDIF
20          CONTINUE
            DIFF=0
            DO 30, J=I, N
30             DIFF=DIFF+ABS(X(I)-Y(I))
            IF (DIFF, LE, EPSILON) GOTO 50
40       CONTINUE
50   ...
```

FIG.28

```
FOR Plocal = 1 :
    REAL A(100, 25), B(100, 0 : 26)
    do k = 1, time
        send(B(2 : 99, 25), Pright)
        recv(B(2 : 99, 26), Pright)
        do j = 2, 25
            do i = 2, 99
                A(i, j) = (B(i, j-1) + B(i-1, j) + B(i+1, j) + B(i, j+1))/4
            enddo
        enddo
        do j = 2, 25
            do i = 2, 99
                B(i, j) = A(i, j)
            enddo
        enddo
    enddo
```

FIG.29

```
FOR Plocal = 2, 3 :
    REAL A(100, 25), B(100, 0 : 26)
    do k = 1, time
        send(B(2 : 99, 1), Pleft)
        send(B(2 : 99, 25), Pright)
        recv(B(2 : 99, 26), Pright)
        recv(B(2 : 99, 0), Pleft)
        do j = 1, 25
            do i = 2, 99
                A(i, j) = (B(i, j-1) + B(i-1, j) + B(i+1, j) + B(i, j+1))/4
            enddo
        enddo
        do j = 1, 25
            do i = 2, 99
                B(i, j) = A(i, j)
            enddo
        enddo
    enddo
```

```
FOR Plocal = 4:
    REAL A(100, 25), B(100, 0 : 26)
    do k = 1, time
        send (B (2 : 99, 1), Pleft)
        recv (B (2 : 99, 0), Pleft)
        do j = 1, 24
            do i = 2, 99
                A (i, j) = (B (i, j-1) + B (i-1, j) + B (i+1, j) + B (i, j+1))/4
            enddo
        enddo
        do j = 1, 24
            do i = 2, 99
                B (i, j) = A (i, j)
            enddo
        enddo
    endod
```

FIG.30

```
 1      MYPE=MYPENUM()
 2      . . .
 3
 4      SUBROUTINE PEX (M1, M2)
 5      DIMENSION PA (4)
 6      . . .
 7   C  META-CODE BEGIN
 8   C  VARIABLE MYPE, M1, M2
 9      . . .
10      N1=(M1-1)/4+1
11      IF (MOD (M1-1, 4). GE. MYPE) N1=N1+1
12      N2=(M2-1)/4+1
13      IF (MOD (M2-1, 4). GE. MYPE) N2=N2+1
14   C  META-CODE END
15
16      DO 1, J=N1, N2, 1
17    1 PA (J) = (J-1) *4+MYPE
18      . . .
19      RETURN
20      END
```

PSEUDO INTEGER N

MELT (N)
N=. . .
FREEZE (N)

FIG.32B

INTEGER N

MELT (N)
N=. . .
FREEZE (N)

```
1    SUBROUTINE INITIALIZE()
2    MYPE=MYPENUM()
3    FREEZE(MYPE)
4    M1=...
5    M2=...
6    FREEZE(M1, M2)
7    RETURN
8    END

9    SUBROUTINE REINIT()
10   MELT(M1, M2)
11   M1=...
12   M2=...
13   FREEZE(M1, M2)
14   ...
15   RETURN
16   END

17   SUBROUTINE PEX()
18 C  META-CODE(M1, M2, MYPE) BEGIN
19   DIMENSION PA(4)
20   LOCAL INTEGER N1, N2
21
22   N1=(M1-1)/4+1
23   IF (MOD(M1-1, 4).GE. MYPE) N1=N1+1
24   N2=(M2-1)/4+1
25   IF (MOD(M2-1, 4).GE. MYPE) N2=N2+1
26
27   DO 1, J=N1, N2 1
28 1 PA(J)=(J-1)*4+MYPE
29 C  META-CODE END
30   ...
31   RETURN
32   END
```

FIG.33

```
1    SUBROUTINE INITIALIZE
2    MYPE=MYPENUM()
3    M1=...
4    M2=...
5    FREEZE()
6    RETURN
7    END
```

```
        OFFSET=(PEY-1)*L+(PEX-1)*W
        DO 10, j=1, L
            DO 10, i=1, W
10              px(j, i)=j+1+OFFSET
```

```
1       LOW = L*(PE-1)+1
2       HIGH = L*PE
3
4       MX = max(M, LOW)
5       NX = min(N, HIGH)
6
7       DO 10, I = MX, NX
8  10       B(I) = A(I)
```

```
          LOW = L*(PE-1)+1
          HIGH = L*PE
(1) N<LOW
    DO NOTHING
```
FIG.41

```
(2) M<=LOW & LOW <=N & N<=HIGH
    DO 10, I= LOW, N
10      B(I) = A(I)

(3) M <= LOW & HIGH <= N
    DO 10, I=LOW, HIGH
10      B(I)=A(I)

(4) LOW <= M & N <= HIGH
    DO 10, I=M, N
10      B(I) = A(I)

(5) LOW <= M & M<= HIGH & HIGH <= N
    DO 10, I=M, HIGH
10      B(I) = A(I)

(6) HIGH < M
    DO NOTHING
```

```
          LOW = L*(PE-1)+1
          HIGH = L*PE
(1) N<LOW
    DO NOTHING
```
FIG.42

```
(2) M<=LOW & LOW <=N & N<=HIGH
    DO 10, I= 1, N-LOW+1
10      PB(I) = PA(I)

(3) M <= LOW & HIGH <= N
    DO 10, I=1, L
10      PB(I) = PA(I)

(4) LOW <= M & N <= HIGH
    DO 10, I=M-LOW+1, N-LOW+1
10      PB(I) = PA(I)

(5) LOW <= M & M<= HIGH & HIGH <= N
    DO 10, I=M-LOW+1, L
10      PB(I) = PA(I)

(6) HIGH < M
    DO NOTHING
```

```
1       SUBROUTINE FOO()
2   C   META-CODE(N, M, L, PE) BEGIN
3       LOCAL INTEGER LOW, HIGH, I
4
5       LOW = 10*(PE-1)+1
6       HIGH = 10*PE
7
8       IF(M, LE, LOW) THEN
9           IF(N, LT, LOW) THEN
10  C           CASE(1) : do nothing
11          ELSE
12              IF(N, LE, HIGH) THEN
13  C               CASE(2)
14                  DO 10, I=1 , N-LOW+1
15      10              PB(I)=PA(I)
16              ELSE
17  C               CASE(3)
18                  DO 11, I=1, L
19      11              PB(I)=PA(I)
20              ENDIF
21          ENDIF
22      ELSE
23          IF(N, LE, HIGH) THEN
24  C           CASE(4)
25              DO 12, I=M-LOW+1, N-LOW+1
26      12          PB(I) = PA(I)
27          ELSE
28              IF (HIGH, LE, M) THEN
29  C               CASE(5)
30                  DO 13, I = M-LOW+1, L
31      13              PB(I) = PA(I)
32              ELSE
33  C               CASE(6) : do nothing
34              ENDIF
35          ENDIF
36      ENDIF
37      META-CODE END
38      STOP
39      END
```

FIG.43

```
1       SUBROUTINE INITIALIZE()
2       PE=MYPENUM()
3       FREEZE(PE)
4       READ(L)
5       FREEZE(L)
6       REAL PA(L)
7       REAL PB(L)
8       READ(PA)
9       READ(PB)
10      STOP
11      END
```

FIG.44

```
1      ...
2      N = ...
3      M = ...
4      FREEZE(N, M)
5      CALL FOO()
6      ...
7      CALL FOO()
8      ...
9      MELT(N, M)
10     CALL FOO()
11     ...
```

PARALLEL PROCESSING SYSTEM WITH EFFICIENT DATA PREFETCH AND COMPILATION SCHEME

This application is a continuation of application Ser. No. 08/212,860, filed on Mar. 14, 1994, now abandoned.

BACKGROUND OF THE INVENTION

1. Field of the Invention

The present invention relates to a high speed processing of indefinite loops and a compilation scheme for realizing a efficient program execution in a parallel processing system.

2. Description of the Background Art

First, the basic technique concerning the prefetching will be described, followed by the description of the dual buffer system, and finally the asychronous transmission in the parallel computer will be mentioned.

Conventionally, in order to speed up the successive execution of usual instructions, many machines employ the so called instruction prefetch buffer. A general instruction prefetch buffer is designed to hold two to eight continuous instructions. Every time the instructions are executed by the CPU one by one, the subsequent instruction words are prefeteched. This is the widely used technique of prefetching in which those instructions which have high probability for being executed in near future are loaded in advance, in parallel to the execution of the foregoing instructions, so as to conceal the time required for loading the instructions.

It has also been done conventionally to expand the target of this prefetching from the instructions to the data. In this case, those data which have high probability for being used in near future are loaded into the cache memory during the other data processing at the CPU, before these data actually become necessary. Here, however, when the data write for the data occurs at a period between the loading of the data as the prefetch data and the actual access to the data, the data loaded by the prefetch are going to be invalidated.

In general, it is more difficult to predict which data are going to be necessary in the near future compared with a case of the instruction. For this reason, there are researches directed toward the advance loading of those data which have high probability for being used. (For example, A. Rogers and K. Li. Software Support for Speculative Loads", SIGPLAN NOTICES Vol. 27, No. 9, Sep. 1992.)

Similarly to a case of the successive execution type computer described above, it is also possible to carry out the instruction prefetch in the MIMD type parallel computer in the similar manner. However, in the MIMD type computer, the data prefetch cannot be carried out in a manner similar to that in the successive execution type computer, because in a case of the parallel computer, a plurality of processors can change the data in parallel, so that there is a need to know when the data are valid and when the data are accessible. In this regard, Rettberg et al. have expressed their desire to carry out the data prefetch in the parallel computer in R. D. Rettberg, W. R. Crowther, P. P. Carvey, and R. S. Tomlinson. "The Monarch Parallel Processor Hardware Design", IEEE Computer, Vol. 23, No. 4, pp. 18–30, 1990, but they failed to provide any concrete scheme for realizing it. After this paper, their project had been abandoned in midstream, so that their research on the data prefetch in the parallel computer had also been interrupted before its completion.

In a case of carrying out the instruction prefetch in the MIMD type parallel computer, there is hardly any problem concerning the protocol and the time required for the prefetching because the instruction is not rewritable and usually stored in the own local memory of the processor. However, in a case of dealing with the data, the values of the data can be changed, and the data can be stored in the other processors, so that the protocol for the prefetching can be quite complicated, and the required time can often be quite enormous. On the other hand, when the prefetching is carried out speculatively, i.e., according to a strategy to prefetch those data which are considered as having high probability for being used even though they may not be used, the load at a time of the data transmission between the processors becomes high, even to such an extent to cancel out the effect of the prefetching in some cases.

In this regard, in a limited area of a specialized part such as an I/O driver, there is a technique called dual buffer system which has a configuration as shown in FIG. 1. In this dual buffer system, two buffers 103A and 103B are provided as a buffer 103 between one I/O device 101 and one CPU 105. Then, in order to read the data from the input device 101 to the CPU 105, while the input device 101 writes the data into one buffer 103A, the CPU 105 reads the data from another buffer 103B. In this manner, the conflict of the accesses with respect to the buffer 103 among the input device 101 and the CPU 105 is avoided to realize the efficient data input. This technique is employed in the specialized programming such as that for the device driver, but it is not utilized in the general user application program because of the lack of the compiler for generating the codes and carrying out the high level transformation required in this technique.

As for the asychronous transmission in the parallel computer, there is a known scheme for indicating whether the buffer is full or empty by means of a single flag. For example, this scheme is applicable to a configuration shown in FIG. 2 in which two processors 107 and 111 are sharing a shared memory 109 containing the data 109A and the flag 109B. In this case, in order to carry out the data write, it is necessary for each processor to wait until this flag 109B indicates "empty" while keep polling, and in order to carry out the data read, it is necessary for each processor to wait until this flag 109B indicates "full" while keep polling. Here, in a case of the PAX computer in which this flag can be provided on the shared memory between adjacent processors, there is hardly any problem for the time cost for making an access to the flag. However, in a general parallel computer in which the processors are connected through a network such that an access to the flag requires an access through the network, the time cost for making an access to the flag becomes significant, and the polling required in this scheme keeps the network in use continuously so that the load on the network becomes high, and it is even possible to interfere with the use of the network by the other processors.

Thus, in the conventional parallel computer, the compiler technique and the hardware support for realizing the data prefetch in the application program have bene unavailable.

Next, the conventional compiler technique will be described in further detail.

In the usual compiler, it has conventionally been done to carry out the calculation involving only constants at a time of compilation rather than at a time of execution. For example, the sentence:

$$x=1+2$$

an be transformed into the sentence:

$$x=3$$

by the compiler, before being further transformed into the execution code.

As a technique to utilize this function more actively, there is a parallel calculation scheme. Here, when a part of the inputs to the program are known, this program is partially calculated within a known range, and only the remaining inputs are set as variables, so as to transform the program into a more efficient one.

For example, in a case of the program shown in FIG. 3A, the value of x is known to be 10, so that this program of FIG. 3A can be transformed into that shown in FIG. 3B.

Also, in Uwe Meyer, "Techniques for Partial Evaluation of Imperative Language", SIGPLAN NOTICES, Vol. 26, No. 9, Sep. 1991, pp. 94–105, an example described by the language in accordance with PASCAL has been disclosed. This example uses a program as shown in FIG. 4A in which N and X are read out, and N-th power of X is calculated, and then the result is substituted into Y and written out at a prescribed position. Here, a symbol $\phi$ attached to X in this example indicates that the attached variable X is unknown. Here, when the input N is known to be 3, the program of FIG. 4A can be transformed into a program with a higher execution efficiency as shown in FIG. 4B.

In such a manner, before the execution, when the value of the variable is known by some means, it is possible to output the codes with a higher efficiency using the partial calculation scheme. However, this scheme cannot handle the variables which can only be predicted at a time of the execution.

In contrast, even for a case in which the values of the variables are totally unknown until the time of the execution, there is a scheme for carrying out the partial execution by setting the variables to be constants, by carrying out a part of the execution at a time of the compilation, as disclosed in Japanese Patent Application Laid Open No. 4-44181 (1992). In this scheme, the execution codes are generated in the following procedure, and then the generated execution codes are loaded as the execution codes into the computer later on and executed.

1. The pre-execution portions to be executed in advance during the compilation are specified in the program. Here, it is guaranteed that the variables specified at this stage are not going to be re-defined subsequently. (Note, however, that a manner of determining the pre-execution range is not described in the specification of the above identified Japanese Patent Application.)

2. The pre-execution portions are executed during the compilation by the compiler or the interpreter, to set the variables to be constants.

3. The partial calculation is carried out according to the variables set to be constants at the above stage, to generate the execution codes with high efficiency.

As an example of this scheme, for a program shown in FIG. 5A, the pre-execution portion can be specified as that within a range from PREEXEC START to PREEXEC END, such that this pre-execution portion can be executed at a time of the compilation by using the data file, and the values of the inputs M1 and M2 are set to be constants. In this manner, the loop repetition number for the subsequent DO loop can be set to be constant, so that the optimization of the execution codes becomes easier.

Now, consider a case of generating the execution codes which are to be operated on four processors, from the source program shown in FIG. 5A. In this case, the array A is divided into four cyclically, and given a name PA. Namely, the array A(i) corresponds to the PA(i/4) of the processor MOD(i-1, 4)+1. When this program is compiled in the usual manner, it becomes necessary to generate the complicated codes as shown in FIG. 6A. That is, the own processor number MYPE is taken out by the function PYPENUM(), and then the starting point N1 and the ending point N2 of the DO loop are obtained while paying attention to the fractions.

Here, if it can be determined that M1=1 and M2=16 by the execution of the pre-execution portion in the program of FIG. 5B. It is possible to transform the program of FIG. 5A into the program with a higher efficiency as shown in FIG. 6B.

However, there are two major problems in this scheme, as follows:

(1) It is difficult to determine the pre-execution range.

Namely, in the example of FIGS. 5A, 5B, 6A, and 6B, the values of M1 and M2 can be determined by one data read, so that the pre-execution range can be determined easily. However, in general, the determination of the pre-execution range is essentially not an easy matter. The general reason why it is difficult to determine the pre-execution range is that the values of the variables can be determined not by just one data read, but by various substitutions of the values. Namely, in order to know a certain value, there is a need to know the values quoted in the equation for defining that certain value. However, when this logic is applied in chain, there is a possibility for the pre-execution range to be almost as wide as the actual execution range.

(2) When the pre-execution range is widened, the amount of intermediate results becomes enormous.

Namely, when the pre-execution range becomes wider for the reason described above, all the variables obtained within the pre-execution range must be embedded into the execution codes. Even for such a variable for which, in a case of not using the pre-execution, it has only been necessary to secure a region as the unknown region at a time of the execution and therefore the object is not going to be made larger, when the value is obtained by the pre-execution, there is a need for the obtained value to be contained as the ascertained value in the object. Consequently, in a case of making the large constant table by the simple algorithm, the object is going to be made larger.

Now, the program execution in the parallel computer will be considered. Namely, in the parallel computer connected with a host computer in a configuration shown in FIG. 7, where the host computer 213 has a compiler 214 for compiling a source program 215 to obtain execution codes 217, and the parallel computer formed by a plurality of processors 221 (221a to 221n) is connected with the host computer 213 though a host-processor network 219, while the processors 221 are connected with each other through an interconnection network 229 and equipped with respective memory regions 222 (222a to 222n), a case of executing the SPMD (Single Program Multiple Stream) type program will be considered.

Conventionally, the execution of such a program is carried out by the following procedure.

1. At the host computer 213, using the compiler 214 provided therein, the source program 215 is transformed into node programs which are executable at individual processors of the parallel computer.

2. At the host computer 213, using the compiler 214 provided therein, the node programs are compiled to produce the execution codes 217.

3. The execution codes 217 produced at the above stage are loaded into the parallel processors through the host-processor network 219, and stored in the memory regions 222 of the processors 221.

4. The execution codes loaded into the memory region 222 of each processor are then executed at each individual processor.

As a concrete example, there is a case of executing the program for the Jacobi method described in Fortran D by transforming it into the node programs, as can be found in Seema Hiranandani, Ken Kennedy, and Chau-Weng Tseng, "Compiling Fortran D for MIMID distributed-memory machines", CACM, Aug. 1992, Vol. 35, No. 8, pp. 66–80, which will now be described.

First, the original program for the general Jacobi method described in Fortran D is shown in FIG. 8. This program of FIG. 8 is that in which, for each element in 100×100 two dimensional array A, a substitution of an average of its upper, lower, right, and left neighbor elements is repeated to "time" times. Here, the array B is used as a back up of the array A. Then, consider a case of executing this program by the four parallel processors. In this case, for the sake of the parallelism, the array A is to be divided into four as follows:

processor 1:A(*, 1) to A(*, 25)
processor 2:A(*, 26) to A(*, 50)
processor 3:A(*, 51) to A(*, 75)
processor 4:A(*, 76) to A(*, 100)

where * denotes an arbitrary number.

Here, however, for the handing of the array element data at boundary portions, the data regions which are larger by one at each cutting plane of the array are actually secured. For this reason, in the program shown in FIG. 9 which is the node program obtained from the original program of FIG. 8, the array B is expressed as B(100, 0:26) rather than B(100, 25). (Note that, in a case the size of the array is specified by one integer, the lower bound is 1, so that 25 in the latter notation implies suffix ranging from 1 to 25. On the other hand, in a case of setting the lower bound different from 1, the lower bound is explicitly declared next to the upper bound with a colon inserted therebetween, so that 0:26 in the former notation implies the suffix ranging from 0 to 26.)

In the program of FIG. 9, "Plocal" indicates a processor number ranging from 1 to 4, and "Pleft" and "Pright" indicate the processor numbers (1 to 4) of the processors which have the left and right neighbor elements at the boundaries of the array, respectively. Also, lb1 and ub1 indicate the lower and upper bounds of the operation targets of the array within each processor, respectively. These values are subtly different depending on the position of the processor. Also, the data transmission and reception patterns are going to be different depending on the position of the processor, so that the there is a need to set different cases for the data transmission and reception at "if" sentence. As such, this node program of FIG. 9 involves the case setting according to "Flocal", which did not exist in the original program of FIG. 8. Consequently, there is going to be an execution overhead due to this case setting.

There is also a proposition for a scheme in which the efficient execution can be realized even when a total number of processors acquired at a time of the execution varies, while simply compiling at the host side, as discloses in Japanese Patent Application Laid Open No. 62-274451 (1987). This is a scheme in which, as shown in FIG. 10, a data ID 300 is regarded as a connected series of a processor number 300A and a processor internal number 300B. In this case, even when a total number of processors changes, the processor number and the processor internal number for data can be extracted from the data ID at a time of the execution.

However, this scheme is associated with the following two serious problems:

(1) A special hardware is required in this scheme. Namely, in order to extract the processor number and the processor internal number from the data ID without significantly lowering the execution speed, a special hardware for this purpose must be provided.

(2) The total number of processors that can be handled in this scheme is limited to the powers of 2. Namely, in the usual binary computer, when the total number of processors is the power of 2, the processor number and the processor internal number can be expressed as a connected series of fields, so that the necessary field can be extracted by using the bit mask. However, in a case a total number of processors for executing the program is a number other than the powers of 2, it is going to require a divider which in turn makes it impractical.

Thus, there has been a need for a scheme which can be processed at a high speed by software alone, without any constraint on the total number of processors.

As described, the execution codes containing the variables that can be set to be constants as variables are lower in execution efficiency. As an improvement in this regard, there has been an attempt for generating the execution codes with a higher efficiency by making the partial calculations based on the information available at a time of compilation statically, but such an attempt can achieve only insufficient improvement. Especially in a case of the parallel execution of the program, a large number of control codes are going to be inserted among the source codes due to the parallelism, and these control codes can cause the large overhead. Also, the conventionally available scheme can only utilize the information that can be determined during the compilation, so that the information, such as the total number and the configuration of the processors acquired at a time of the execution, which is essentially available only at a time of the execution, could not have been utilized in the compilation conventionally.

SUMMARY OF THE INVENTION

It is therefore an object of the present invention to provide a parallel processing system capable of facilitating the data prefetch in the parallel computer.

It is another object of the present invention to provide a parallel processing system for realizing a compilation scheme capable of removing the overhead caused by the execution of the control codes due to the parallelism.

According to one aspect of the present invention there is provided a parallel processing system, comprising: data dependency analysis means for analyzing a program to be executed in the system so as to obtain data dependency of each operation in the program: and a plurality of processors for executing the program in parallel, which are connected with each other and with the data dependency analysis means through a network and sharing a distributed shared memory, each processor having a distributed part of the distributed shared memory; wherein each processor recognizes those processors which have possibilities to require data allocated to the distributed part of the distributed shared memory in said each processor according to the data dependency of each operation obtained by the data dependency analysis means, and transmits the data to said those processors before said those processors actually require the data.

According to another aspect of the present invention there is provided a parallel processing system, comprising: host computer having a host side compiler for compiling a program to be executed in the system, such that parallel processing independent portions of the program are compiled up to object-codes linkable to other modules, while leaving parallel processing dependent portions of the program as intermediate-codes; and a plurality of processors for executing the program in parallel, which are connected with the host computer through a network, each processor being a node side compiler for optimally compiling the object-codes and the intermediate-codes obtained by the host side compiler to obtain optimum execution codes to be executed at said each processor according to information concerning parallelism.

According to another aspect of the present invention there is provided a method of parallel processing by a parallel processing system including a plurality of processors connected with each other through a network and sharing a distributed shared memory, each processor having a distributed part of the distributed shared memory, the method comprising the step of: analyzing a program to be executed in the system so as to obtain data dependency of each operation in the program; recognizing at each processor those processors which have possibilities to require data allocated to the distributed part of the distributed shared memory in said each processor according to the data dependency of each operation obtained at the analyzing step; and transmitting the data from said each processor to said those processors before said those processors actually require the data.

According to another aspect of the present invention there is provided a method of parallel processing by a parallel processing system including a host computer having a host side compiler and a plurality of processors connected with the host computer through a network, each processor having a node side compiler, the method comprising the step of: compiling a program to be executed in the system at the host side compiler such that parallel processing independent portions of the program are compiled up to object-codes linkable to other modules, while leaving parallel processing dependent portions of the program as intermediate-codes; optimally compiling the object-codes and the intermediate-codes obtained by the host side compiler at the node side compiler of each processor to obtain optimum execution codes according to information concerning parallelism; and executing the program by using the object-codes obtained by the host side compiler and the optimum execution code obtained by the node side compiler.

Other features and advantages of the present invention will become apparent from the following description taken in conjunction with the accompanying drawings.

BRIEF DESCRIPTION OF THE DRAWINGS

FIGS. 3A and 3B are illustrations of programs indicating one exempary case of a conventional partial calculation scheme.

FIGS. 4A and 4B are illustrations of programs indicating another exemplary case of a conventional partial calculation scheme.

FIGS. 5A and 5B are illustrations of programs indicating one exemplary case of a conventional pre-execution scheme.

FIGS. 6A and 6B are illustrations of programs indicating another exemplary case of a conventional pre-execution scheme.

FIG. 8 is an illustration of a program to be executed in the parallel computer of FIG. 7.

FIG. 9 is an illustration of a node program obtained from the program of FIG. 8.

FIG. 10 is a diagrammatic illustration of a data ID used in one conventional compilation scheme.

FIG. 18 is an illustration of an exemplary source program used in the first example of the application of the first embodiment.

FIGS. 19A and 19B is an illustration of a program transformed from the source program of FIG. 18 in view of the parallelism.

FIG. 22 is an illustration of an exemplary source program used in the second example of the application of the first embodiment.

FIG. 23 is an illustration of a program transformed from the source program of FIG. 22 in view of the parallelism.

FIG. 24 is a diagrammatic illustration of correspondence among flags on the processors in the first example.

FIG. 25 is an illustration of an exemplary program without an application of the first embodiment.

FIG. 26 is an illustration of an exemplary program corresponding to the program of FIG. 25, which is the third example of the application of the first embodiment.

FIGS. 28, 29, and 30 are illustrations of exemplary execution codes obtained by compiling the program of FIG. 8 by the system of FIG. 27 in a case of using four processors.

FIG. 31 is an illustration of an exemplary program corresponding to the conventional programs of FIGS. 5A, 5B, 6A, and 6B according to the second embodiment.

FIGS. 32A and 32B are illustrations of manners for using pseudo constants according to the second embodiment.

FIG. 33 is an illustration of a program corresponding to the program of FIG. 31, written in terms of the pseudo constants according to the second embodiment.

FIG. 34 is an illustration of a possible manner for using pseudo constants according to the second embodiment.

FIGS. 36A and 36B are illustrations of an exemplary program used in one example of the application of the second embodiment seen from two viewpoints.

FIG. 37 is an illustration of source codes used in another example of the application of the second embodiment.

FIG. 38 is an illustration of a program transformed from the source program of FIG. 37 in view of the parallelism.

FIG. 41 is an illustration of case settings of FIG. 40 given in language of a program of FIG. 37.

FIG. 42 is an illustration of case settings of FIG. 40 given in language of a program of FIG. 38.

FIG. 43 is an illustration of meta-codes obtained from a program of FIG. 37.

FIG. 44 is an illustration of an initial routine for a program of FIG. 43.

FIG. 48 is an execution program for the meta-codes of FIG. 43.

DETAILED DESCRIPTION OF THE PREFERRED EMBODIMENTS

Figure 1:
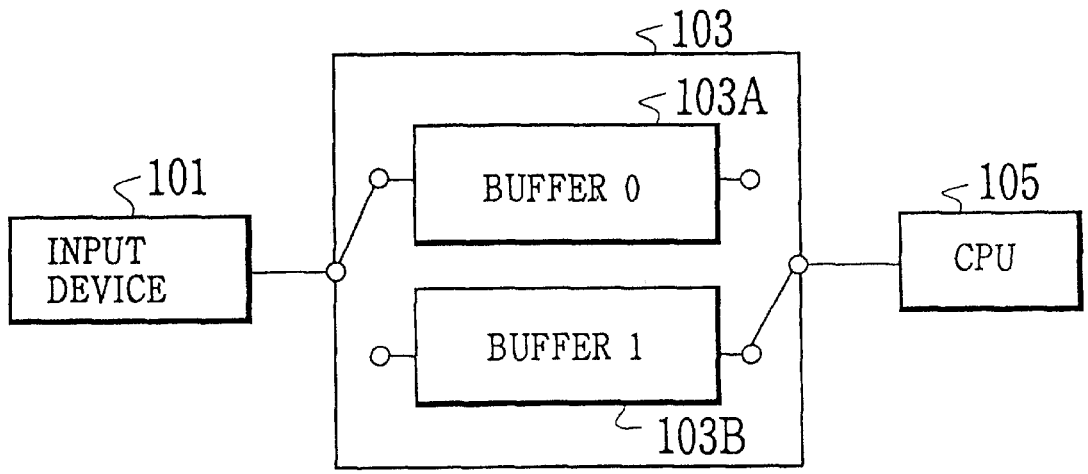
FIG. 1 is a schematic diagram of a conventional dual buffer system.
Figure 2:
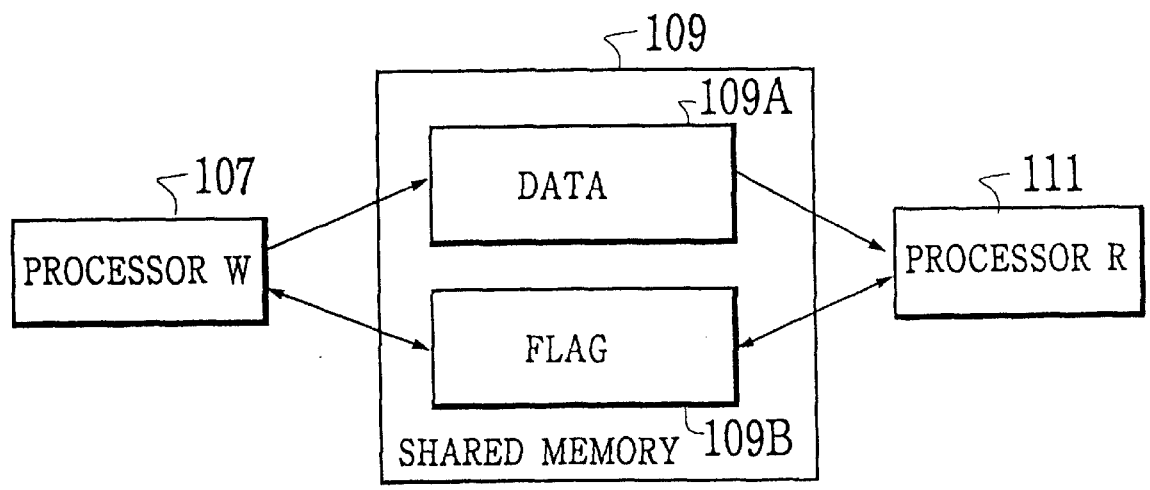
FIG. 2 is a schematic diagram of a conventional PAX computer using asychronous transmission.
Figure 7:
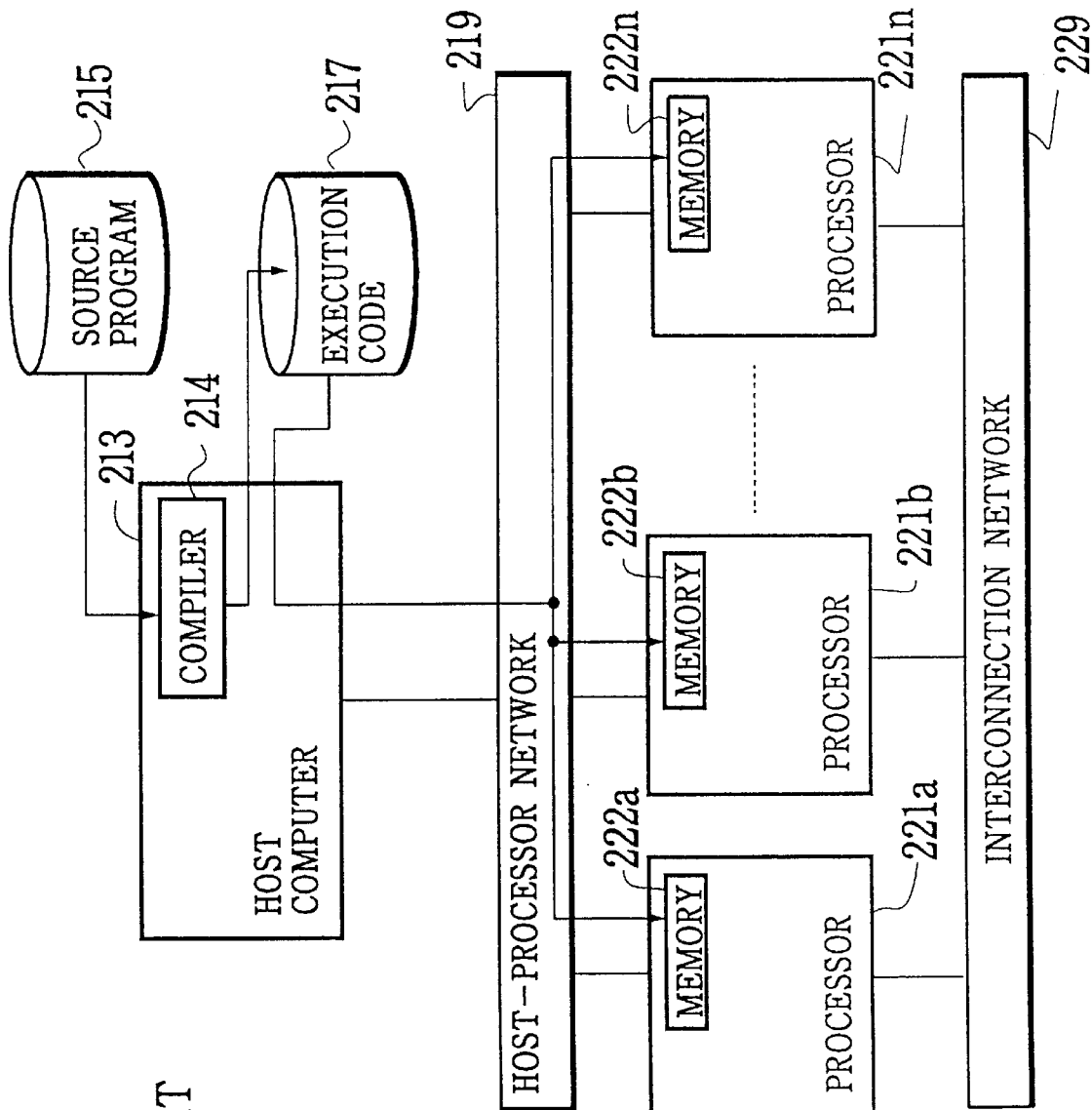
FIG. 7 is a schematic block diagram of a conventional MIMD type parallel computer.
Figure 11:
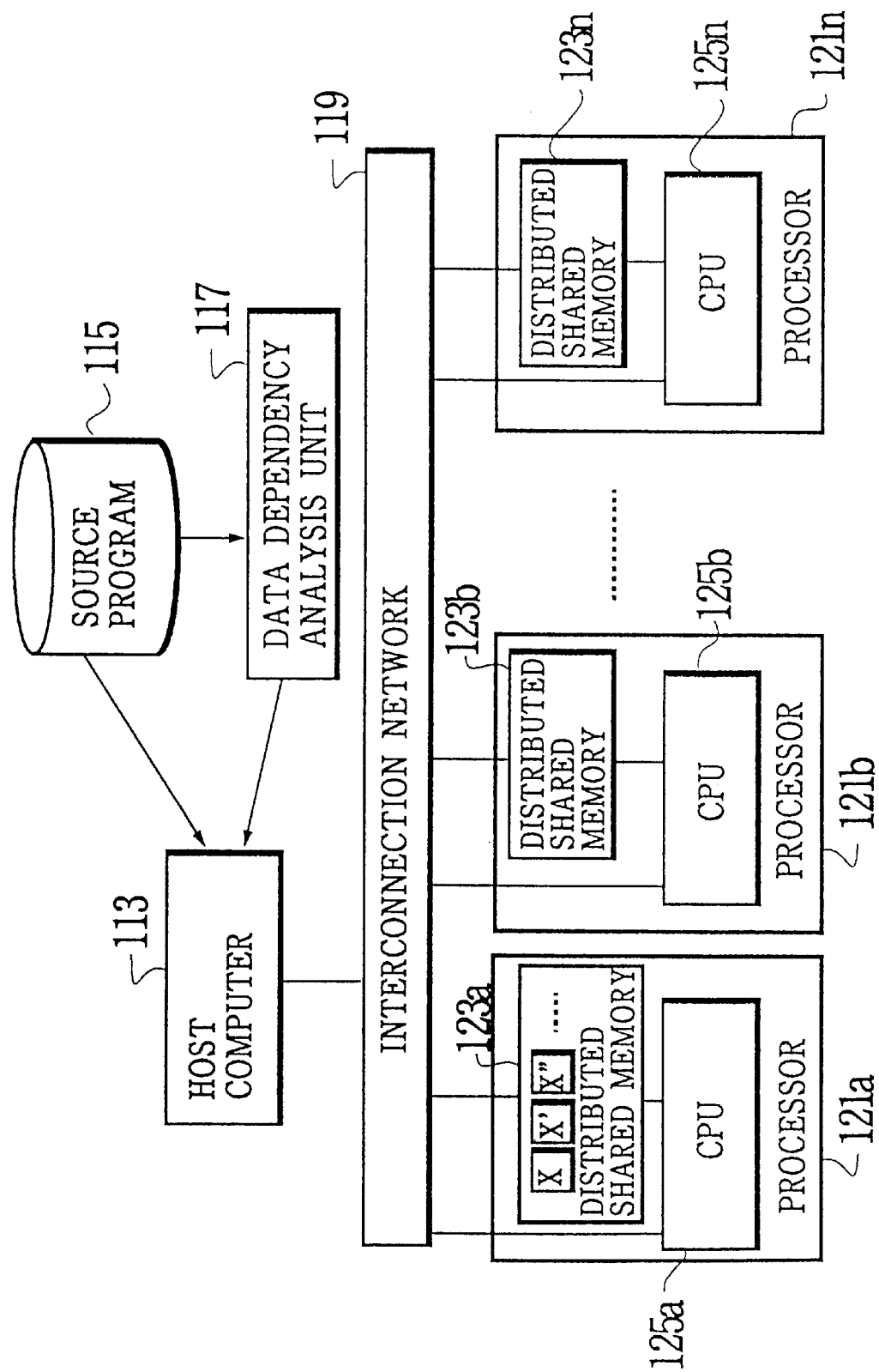
FIG. 11 is a block diagram of a first embodiment of a parallel processing system according to the present invention.

Referring now to FIG. 11, a first embodiment of the present invention concerning a high speed processing of indefinite loops will be described in detail.

In this first embodiment, the parallel processing system has a configuration as shown in FIG. 11, which comprises: a host computer 113; a data dependency analysis unit 117 for analyzing data dependency in a source program 115; a plurality of processors 121 (121a to 121n), each of which has a distributed shared memory 123 (123a to 123n) and a CPU 125 (125a to 125n); and an interconnection network 119 for connecting the processors 121 with each other as well as with the host computer 113.

Here, the CPU 125 of each processor 121 receives the data dependency analysis result for the source program 115 obtained by the data dependency analysis unit 117 through the host computer 113 and the interconnection network 119, and recognizes which data stored in its own distributed shared memory 123 are likely to be required by the other processors 121 by itself according to the received data dependency analysis result, without requiring requests from the other processors 121, and then transmits the required data to the relevant processors 121. On the other hand, each processor 121 has a designated data storage region for receiving the transmitted data from the other processors 121 on its own distributed shared memory 123, where the designated data storage region includes multifold storage areas for each symbol data to which the transmitted values for the same symbol data are cyclically stored.

More specifically, the parallel processing system of this first embodiment operates as follows.

Namely, by analyzing the data dependency in the source program 115, it becomes possible for each processor 121 to judge which data are likely to be required by which processor 121. Consequently, each processor 121 transmits the data stored in its own distributed shared memory 123 which are judged as likely to be required by the other processors 121 to the relevant processors 121, without requiring data requests from the other data requiring processors 121. Thus, in this first embodiment, there is no need to transmit a data request from each data requiring processor 121 to a data possessing processor 121 at a time of actually requiring the data, so that the highly efficient data transmission scheme among the processors 121 can be realized.

In such a transmitting side initiated data transmission, there is a need to prevent the erroneous overwriting of the data in use at the processor 121 on the receiving side. To this end, the designated data storage region provided in the distributed shared memory 123 of each processor 121 includes multifold storage areas for each symbol data, such that the storage area to store the transmitted value for each symbol data is cyclically changed every time a version of this symbol data is updated as a new transmitted value is received. In this manner, the transmitting side can carry out the safe data transmission to the storage area currently not used by the receiving side processor 121.

Here, it is to be noted that, for any one data, there is only one processor 121 which has a right to change the value of this one data, so that only this one processor 121 caries out the transmission of the value for this one data to the other processors 121. Consequently, it is possible for this one processor 121 to make a management as to which one of the multifold storage areas should the next value of this one data be written.

Figure 12:
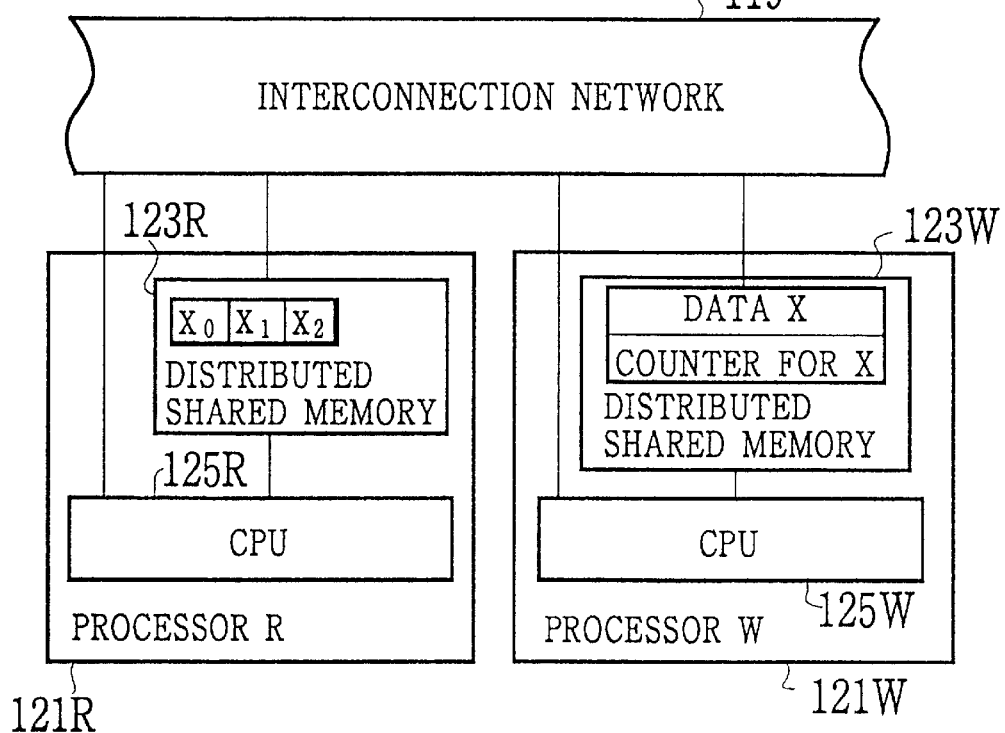
FIG. 12 is a schematic diagram of the processors in the parallel processing system of FIG. 11, for illustrating data write position management in the first embodiment.

For example, in a case shown in FIG. 12, the processor R 121R has the threefold storage areas (x0, x1, x2) for the data x, to which the value for this data x can be written by the processor A 121W which has the right to update this variable data cyclically. Here, in order to indicate which one of the multifold storage areas should the next value of this data x be written, the processor W 121W has a counter for this data x. In a case of using n-fold storage areas, this counter indicates a value of 0 to (n–1) cyclically, such that the value indicated by this counter can specify one of the n-fold storage areas to which the next value of this data x should be written. After each writing of a new value, the value indicated by this counter is increased by one, and when the increased value reaches to n, the value is reset to 0. Thus, this counter indicates the version of the data x modulo n. This counter for the data x is provided only in the processor W 121W as this processor W 121W alone has a right to change the value of this data x, so that only one counter is needed for each data regardless of a number of the processors 121 involved.

Figure 13:
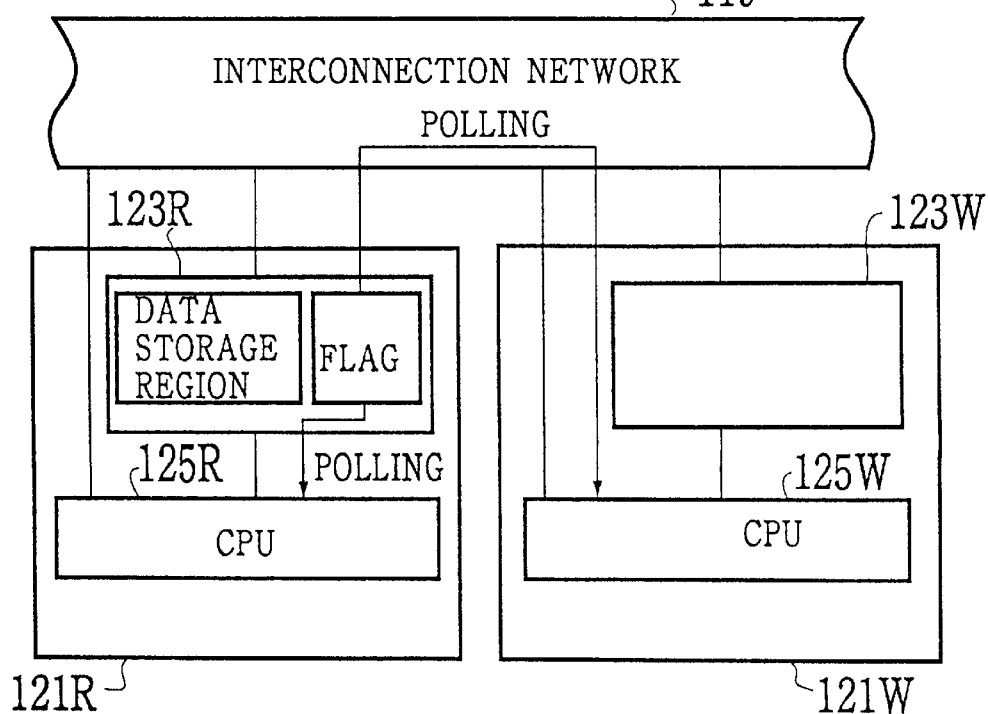
FIG. 13 is a schematic diagram of the processors in the parallel processing system of FIG. 11, for illustrating a case in which data state flag is provided on receiving side.
Figure 14:
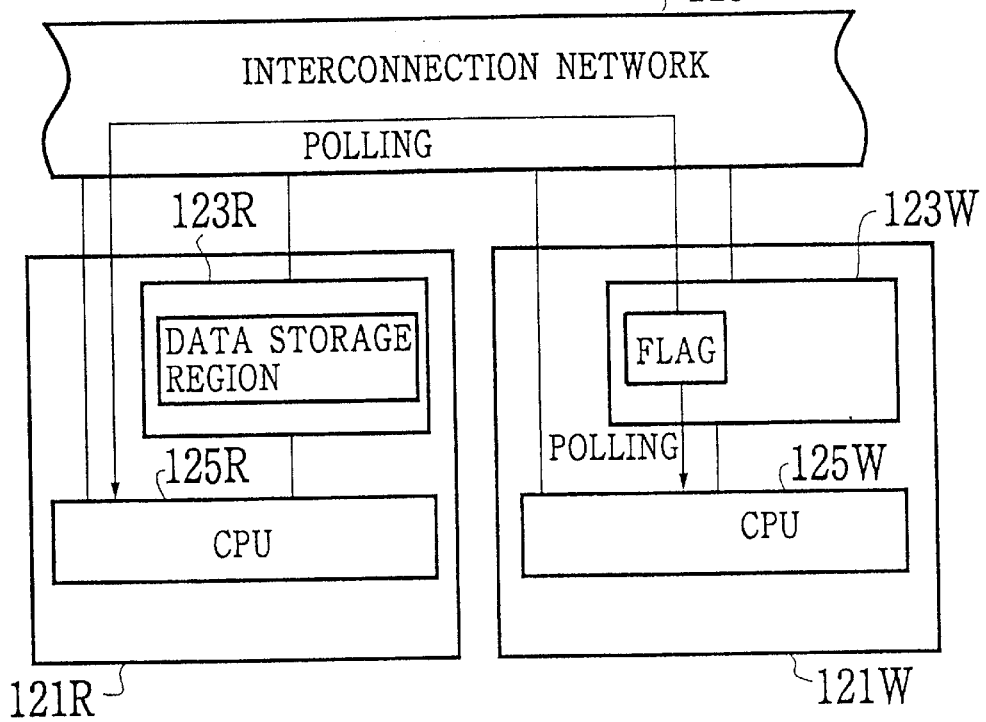
FIG. 14 is a schematic diagram of the processors in the parallel processing system of FIG. 11, for illustrating a case in which data state flag is provided on transmitting side.

Now, consider a case in which the processor W 121 W writes the data into the distributed shared memory 123R of the processor R 121R. In this case, suppose there is only one flag for each data as in a conventional case. When this flag is provided on the processor R 121R side as shown in FIG. 13, the processor R 121R can know whether this data has been written or not by accessing this flag locally within itself. On the other hand, in order for the processor W 121W to know whether this data can be written or not, there is a need to repeat the remote accesses to this flag on the processor R 121R by polling as shown in processor W 121W side as shown in FIG. 14, the processor W 121W can know whether this data can be written or not by accessing this flag locally within itself, but in order for the processor R 121R to know whether this data has been written or not, there is a need to repeat the remote accesses to this flag on the processor W 121W by polling as shown in FIG. 14.

This overhead due to the polling for the remote access can be eliminated in this first embodiment by providing the flag for each data distributedly on both of the transmitting and receiving sides.

Figure 15:
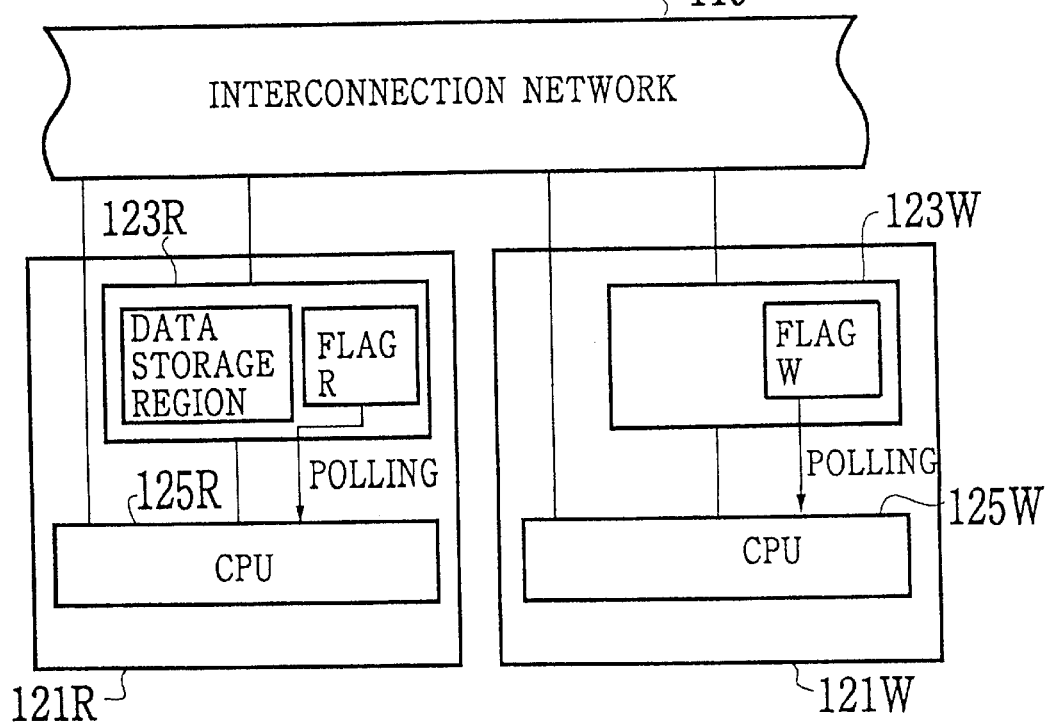
FIG. 15 is a schematic diagram of the processors in the parallel processing system of FIG. 11, for illustrating a case in which data state flag is distributed on both transmitting and receiving sides.

Namely, the processor W 121W has a flag W for indicating an allowance of data write, while the processor R 121R has a flag R for indicating an allowance for data read as shown in FIG. 15. In this case, the processor W 121W must wait until the flag W indicates "T(true)" by polling, but this access to the flag W is located within the processor W 121W itself so that this access is not going to give an extra load to the interconnection network 119. This flag W is turned into "T" by the operation of the processor R 121R. Similarly, the processor R 121R must wait until the flag R indicates "T" by polling, but this access to the flag R is located within the processor R 121R itself so that this access is also not going to give an extra load to the interconnection network 119. This flag R is turned into "T" by the operation of the processor W 121W.

Then, in a case the processor W 121W writes the data into the processor R 121R, starting from the initial state in which the flag R is "F(false)" and the flag W is "T", the processor W 121W can write the data into the processor R 121R only after the flag W has been turned into "T" and this processor W 121W turns this flag W into "F" (or else the flag W is turned into "F" after the data is written) and then turns the flag R into "T", while the processor R 121R can read the data only after the flag R has been turned into "T" and this processor R 121R turns this flag R into "F" (or else the flag R is turned into "F" after the data is read) and then turns the flag W into "T". This protocol is adopted in order to guarantee the prevention of the overwrite of the data, i.e., an occurrence of a situation in which, before the processor R reads the written data, the processor W writes a new data at the same position. The state transition diagram for these flags W and R is shown in FIG. 16.

Figure 16:
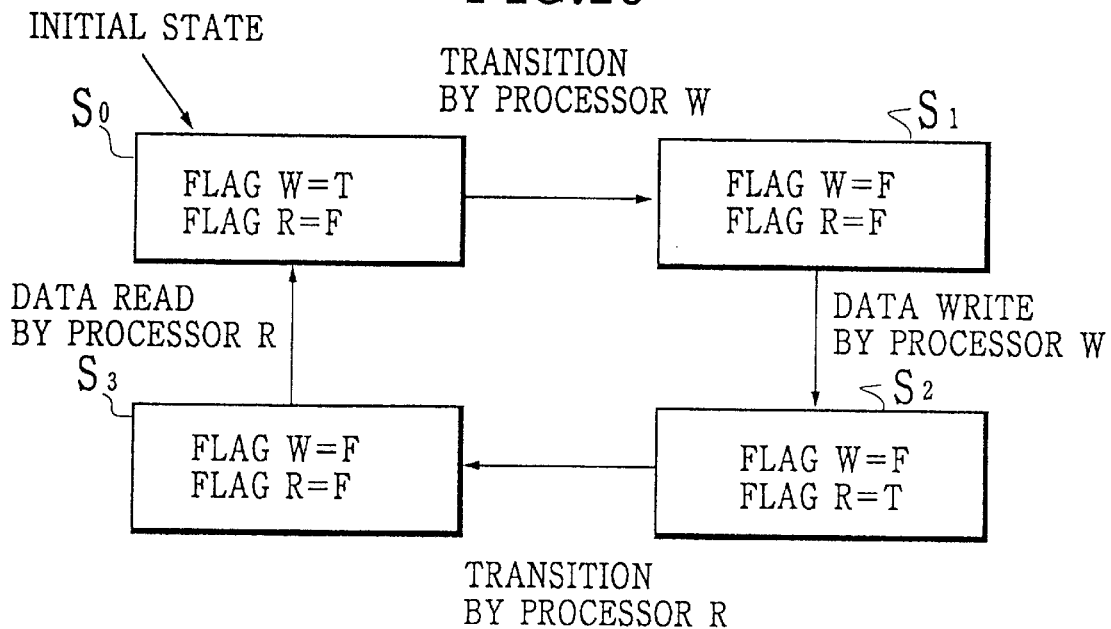
FIG. 16 is a representative state transition diagram in a case of FIG. 15.
Figure 17:
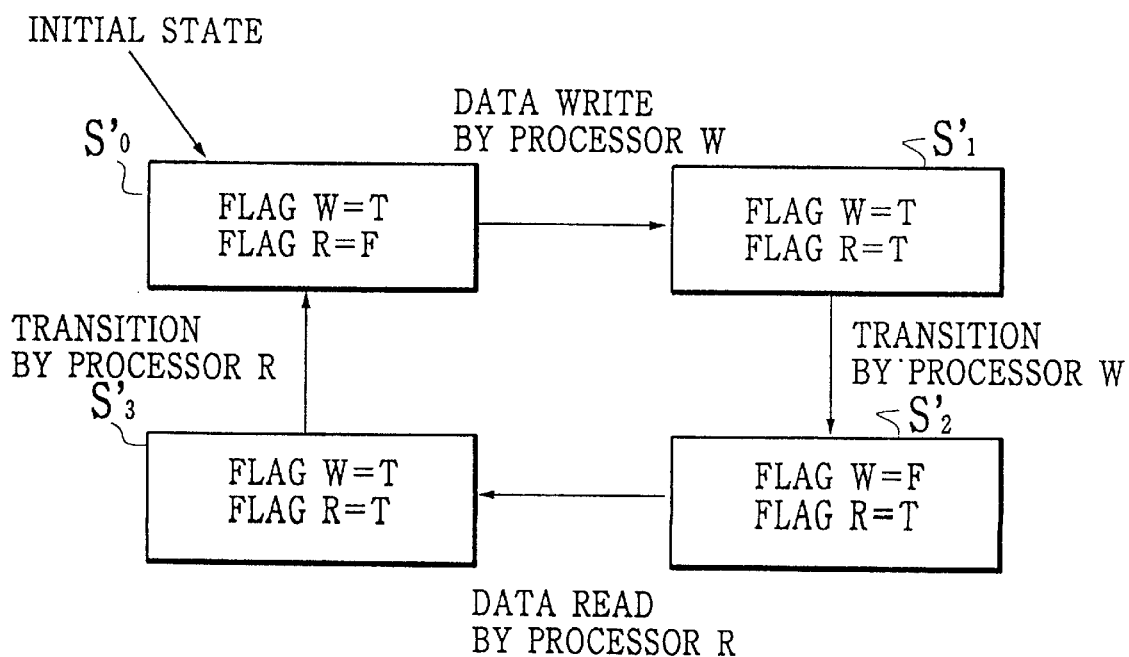
FIG. 17 is one alternative state transition diagram in a case of FIG. 15.

Here, the same result can also be obtained by three possible variations to this state transition diagram of FIG. 16, resulting by interchanging the operation of the data write by the processor W and the operation to turn the flag W into "F", and/or by interchanging the operation of the data read by the processor R and the operation to turn the flag R into "F". FIG. 17 shows a case in which both of these interchanges are incorporated.

In a case of dealing with multiple loops having DO ALL (or FOR ALL) type loop as an inner loop (including those multiple loops that can be turned into this type of the multiple loops by the exchange of the loops), the data transmission is carried out after the last substitution took place within the inner loop.

The DO ALL (or FOR ALL) is a command indicating that this loop can be executed in an arbitrary order. In this case, the variables used in this loop have the same values as they had before entering this loop. Consequently, it suffices for these variables to be transmitted to the processors which require them by the time that inner loop is finished and it proceeds to the next inner loop.

When a processor A has data "a", and each processor Bi ($1 \leq i \leq N$) has data "bi", and the processor A requires the newest data "bi" in order to update the data "a", while the processor Bi requires the newest data "a" in order to update the data "bi", each processor needs to have the two-fold data storage areas.

This processor A needs to have 2N flags fi,p for the two-fold data storage areas, where the flag fi,p corresponds to the p-th area of the data storage areas for the processor Bi, such that the processor Bi writes the data "bi" into the each of the two-fold data storage areas in the processor A alternately, and turns the flag for that area into true after the data write, and then the processor A reads that data "bi" and turns the flag for that data into false.

When the processor A is calculating the j-th updated data value for the data "a", the processor Bi is also calculating the j-th updated data value for the data "bi" or has already finished this calculation. At this point, there is no possibility for the processor Bi to be calculating the (j−1)-th updated data value for the data "bi". In that case, it is in a state in which the (j−1)-th data value of the data "bi" is still uncertain, and there is no way the j-th data value of the data "a" can be calculated in such a state. Also, there is no possibility for the processor Bi to be calculating the (j+1)-th updated data value for the data "bi", because at this point, the value of the data "a" is uncertain, so that the processor Bi cannot start calculating the (j+1)-th updated data value for the data "bi".

In such a state, when the processor A has calculated the j-th data value of the data "a" and tries to write that value, it suffices for the processor Bi to have the (j−1)-th data value of the data "a", and there is no need to have the any other earlier data values of the data "a". Therefore, after the calculation of the j-th data value of data "a" is finished, the processor A can write the j-th value of the data "a" over the (j−2)-th value of the data "a" without requiring a confirmation from the processor Bi. In other words, it suffices for the processor Bi to have the two-fold data storage areas for storing the data "a".

It is also possible to control two communicating processors such that there is no overtake among the flags W and R. Also, in a case two processors are logically cooperating with each other to carry out the calculation, the overtake in the data storage areas cannot possibly occur, but the overtake of the flag controls may occur. For this reason, the flag can be provided for each data storage area. In this manner, the required memory capacity for the flags are the same as in a case of providing two-fold data storage areas with the flags W and R. Here, however, the set up of both flags W and R are required for each data write in general, but in a case of using two flags alternately, the set up of only one flag is required for each data write, so that the time required for the flag control can be saved. Also, the reading of the value of the flag is not considered here, but the reading of the flag is the local access while the writing of the flag is the remote access, so that the set up of the flag is more important than the look up of the flag.

For the programmer, the multi-fold data storage areas are given as something which implies the version of the data, such that it becomes possible to provide the environment in which the different versions of the data can be accessed distinguishably from the programs.

For the computer, when the values for a plurality of versions are held, the programming can be made much easier by allowing the look up of these values from the program. For example, it is possible to consider a case in which the repeat is terminated when the sum of the absolute values of the differences between the old and new values becomes less than or equal to a certain value. In such a case, if the presence of the old and new versions are hidden from the user, the programmer is going to prepare an array for holding the old values and the old values are going to be copied there. However, such an overhead becomes unnecessary when the both old and new values are made to be accessible from the program as in the present invention.

Now, three exemplary cases for the application of the first embodiment described above will be illustrated in detail.

EXAMPLE 1

This is an example for a case of parallel execution of the source program shown in FIG. 18. In this source program of FIG. 18, N, COEF, and EPSILON are constants. This C-like source program is for a one-dimensional array x, in which the new value for each element is obtained as by multiplying COEF with a sum of its own value and two neighboring values, and it is repeated until the square sum of the differences of the new and old values converges to less than or equal to EPSILON.

By analyzing this source program by the data dependency analysis unit, the array "old_x" can be recognized as that which holds the immediately previous version of the array x. In this case, in consideration of the parallel processing, this program is executed by being converted in the program shown in FIGS. 19A and 19B.

Figure 20:
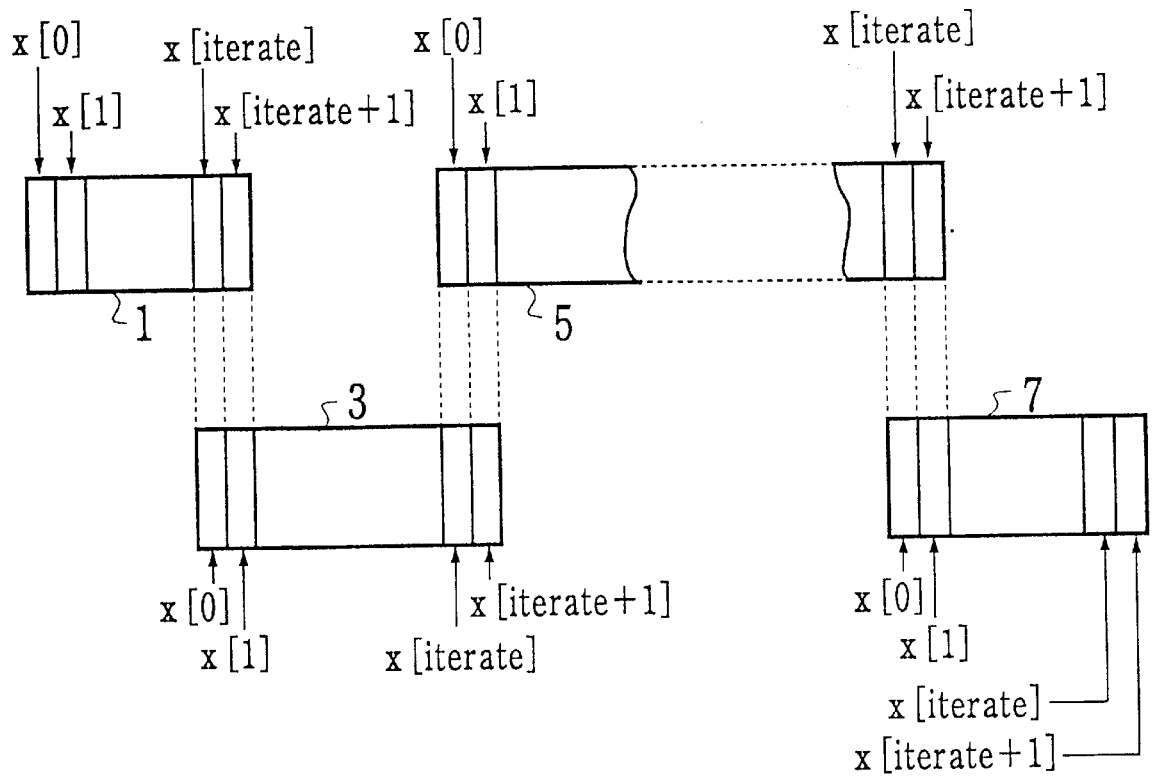
FIG. 20 is a diagrammatic illustration of distributed assignments of an array of the program of FIGS. 19A and 19B to processors.
Figure 21:
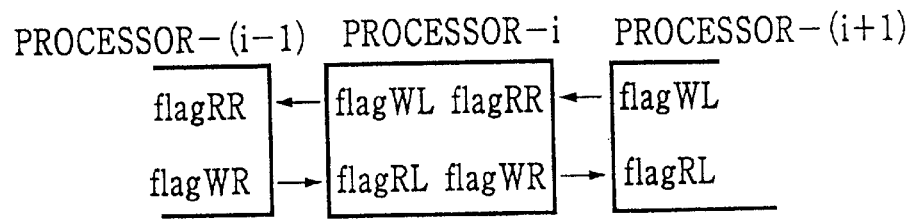
FIG. 21 is a diagrammatic illustration of corresponding among flags on the processors in the first example.

Now, this array x is distributed on the parallel computer as shown in FIG. 20 such that the load for each processor becomes equal. In this manner, except for the ends, the value of x is going to be exchanged among the processors, and each processor has the divided array x. This is an array which has (iterate+2) elements, and x[0] of the processor-i stores the value of x[iterate] of the processor-(i−1), while x[1] to x[iterate] stores the data values for the assigned part of x of this processor-i, and x[iterate+1] stores the value of x[1] of the processor-(i+1), as indicated in FIG. 20. Here, for the simplicity, from a viewpoint of the processor-i, the processor-(i+1) will be referred as a right neighbor processor while the processor-(i−1) will be referred as a left neighbor processor. In this case, the correspondences among the flags are as indicated in FIG. 21.

In the following, the lines of the converted program shown in FIGS. 19A and 19B will be explained.

L6–L7: The processor-i has the flag WL and the flag RL for the sake of the data communications with the processor-(i−1), and the flags WR and the flag RR for the sake of the data communications with the processor-(i+1).

L9: sync (REQUEST) is a synchronization request to make all the processors to operate synchronously. Here, the processor is going to just issue the synchronization request without waiting for the completion of the synchronization.

L10–L11: A total number of the processors are set as PE_NUM, and each processor pe_id (0≦pe_id<PE_NUM) for the array of a size n is assigned with (iterate) elements. Here, (iterate) is equal to (n+PE_NUM−1)/PE_NUM when pe_id<PE_NUM−1, and to n−(PE_NUM−1)*((n+PE_NUM−1)/PE_NUM) when pe_id=PE_NUM.

L12: sync (WAIT) waits until all the processors are synchronized.

L14: Assuming that it begins in a state in which the flag WL and the flag WR are true, the flag WL and the flag WR are turned into false first.

L15–L17: The processor pe_id>0 writes the value of x[1] into x[iterate+1] of the left neighbor processor. Here, "left hand side equation LHE @ processor PE" expresses that it is the left hand side equation LHE of the data stored in the processor PE. Then, the flag RR of the left neighbor is turned into true.

L18–L19: In a case of the leftmost processor, simply its own flag RL is turned into true.

L21–L23: The processor pe_id<(PE_NUM−1) writes its own x[iterate] into x[0] of the right neighbor processor and truns the flag RL of the right processor into true.

L24–L25: In a case of the rightmost processor, simply its own flag RR is turned into true.

L32–L33: The data write is awaited.

L34: The old and new ones of the array x are interchanged.

L35–L40: The value of x at each processor is updated, and a partial sum of the square of the differences between the old and new values is collected to "dif".

L41–L42: After the square sum "gsum" is set as undefined (UNDEF), the sum of "dif" at all the processors is obtained asynchronously. Here, asynchronously implies that the operation to obtain this "gsum" and the execution of the following program codes are carried out in parallel. Namely, the operation to obtain the global sum of the partial sums "dif" and the transmission of the new values of x to be carried out from now on are carried out in parallel. In order to ascertain when this "gsum" is obtained, this "gsum" has a negative value "UNDEF" in advance. The square sum is always non-negative, so that when the non-negative value is set to this "gsum", it can be said that this "gsum" is determined.

L43–L45: As the use of the data is over, the flag RL and the flag RR are turned into false while the flag WL and the flag WR are turned into true.

L47–L67: These are a routine for the data transmission. The processing starts with one of the flag WL and the flag WR which is turned into true earlier. If the flag WL is turned into true earlier, first at L48–L56, the data of x[1] is transmitted to the left neighbor processor, and the flag RR of the left neighbor processor is turned into true. At L52, the turning of the flag WR into true is awaited, and then x[iterate] is transmitted to the right neighbor processor and the flag RL of the right neighbor is turned into true. On the contrary, if the flag WR is turned into true earlier, first at L57–L65, the data of x[iterate] is transmitted to the right neighbor processor, and the flag RL of the right neighbor is turned into true. At L61, the turning of the flag WL into true is awaited, and then x[0] is transmitted to the left neighbor processor and the flag RR of the left neighbor is turned into true.

In the codes of L48–L66, the consideration of the processors at ends are obscure due to the measure for speeding up, so this consideration will be explained now. When the leftmost processor-0 satisfies the condition of L48, there is a possibility for (pe_id−1) of L49 to take an inappropriate value. However, at the processor-0, the value of the flag WL is turned into false at L14, and L45 which is an only line that can turn the flag WL into true is never executed for the processor-0, so that the flag WL is always false at the processor-0. Therefore, it is impossible to satisfy the condition of L48. For this reason, it becomes unnecessary to check the condition that the processor number is greater than 0 before the condition of L48. Similarly, at the processor PE_NUM−1, the flag WR is always false, so that no trouble occurs.

L68: The determination of the global sum of "dif" requested at L42 is awaited.

L69: The loop L28–L68 is repeated until the square sum of the errors becomes less than or equal to EPSILON.

EXAMPLE 1

This is an example for a case of parallel execution of the source program shown in FIG. 22. In this source program of FIG. 22, N, COEF, and EPSILON are constants. This C-like source program is for a one-dimensional array x, in which the new value for each element is obtained as by multiplying COEF with a sum of its own value and two neighboring values, and it is repeated until the square sum of the differences of the new and old values converges below EPSILON. This program is almost equivalent to that of the EXAMPLE 1 described above, except that the array x is in ring shaped. Namely, the next element of the last element in the array x for the processor-(PE_NUM-1) is the first element in the array x for the processor-0. Also, the element before the first element in the array x for the processor-0 is the last element in the array x for the processor (PE_NUM-1).

By analyzing this source program by the data dependency analysis unit, the array "old_x" can be recognized as that which holds the immediately previous version of the array x. In addition, it can be recognized that it is in a situation in which the use of the two-fold data storage areas is sufficient as described above. Namely, it can be recognized that it is a situation in which, when a processor A has data "a", each processor Bi ($1 \leq i \leq N$) has data "bi", and the processor A requires the newest data "bi" in order to update the data "a" while the processor Bi requires the newest data "a" in order to update the data "bi", each processor has the two-fold data storage areas, the processor A has 2N flags fi,p for the two-fold data storage areas, where the flag fi,p corresponds to the p-th area of the data storage areas for the processor Bi, such that the processor Bi writes the data "bi" into the each of the two-fold data storage areas in the processor A alternately, and turns the flag for that area into "T" after the data write, and then the processor A reads the data "bi" and turns the flag for that data into false. In this case, in consideration of the parallel processing, this program is executed by being converted in the program shown in FIG. 23.

Now, this array x is distributed on the parallel computer such that the load for each processor becomes equal. In this manner, except for the ends, the value of x is going to be exchanged among the processors, and each processor has the divided array x. This is an array which has (iterate+2) elements, and x[0] of the processor-i stores the value of x[iterate] of the processor-(i-1), while x[1] to x[iterate] stores the data values for the assigned part of x of this processor-i, and x[iterate+1] stores the value of x[1] of the processor-(i+1). Here, for the simplicity, from a viewpoint of the processor-i, the processor-(i+1) will be referred as a right neighbor processor while the processor-(i-1) will be referred as a left neighbor processor. In this case, the correspondences among the flags are as indicated in FIG. 24.

In the following, the lines of the converted program shown in FIG. 23 will be explained.

L7: The variable "phase" takes the values of 0 and 1 alternately, so as to memorize which buffer or flag is to be set up.

L8: The processor-i has the flag RL[2] in order to learn that the data have been written from the processor-(i-1), and the flags RR[2] in order to know that the data have been written from the processor-(i+1).

L10: sync(REQUEST) is a synchronization request to make all the processors to operate synchronously. Here, the processor is going to just issue the synchronization request without waiting for the completion of the synchronization.

L11–L12: A total number of the processors are set as PE_NUM, and pe_id ($0 \leq pe\_id < PE\_NUM$) for the array of a size n is assigned with (iterate) elements. Here, (iterate) is equal to (n+PE_NUM-1)/PE_NUM when pe_id<PE_NUM-1, and to n-(PE_NUM-1)*((n+PE_NUM-1)/PE_NUM) when pe_id=PE_NUM-1

L13: sync (WAIT) waits until all the processors are synchronized.

L15: Considering the fact that the data are managed in a ring shape, the number of the left neighbor processor is substituted into "pe".

L16: The data are transmitted to the left neighbor processor.

L17: The flag RR[phase] of the left neighbor processor is turned into true. For the left neighbor processor, it implies that the data are set from the right neighbor, so that the flag RR rather than the flag RL is turned into true.

L19: Considering the fact that the data are managed in a ring shape, the number of the right neighbor processor is substituted into "pe".

L20: The data are transmitted to the right neighbor processor.

L21: The flag RR[phase] of the left neighbor processor is turned into true.

L23–L51: These are repeated until the convergence is obtained.

L27: The data write for the data of "phase" from the left neighbor processor is awaited.

L28: The data write for the data of "phase" from the right neighbor processor is awaited.

L29: The old and new ones of the array x are interchanged.

L30–L35: For all the elements of the array x, a new value is calculated.

L33: The square of the error is obtained at "v".

L34: The square sum of the errors is obtained at "dif".

L36–L37: After the square sum "gsum" is set as undefined (UNDEF), the sum of "dif" at all the processors is obtained asynchronously.

L38: The data write completion flags RL[phase] and RR[phase] of the left and right neighbor processors are turned into false.

L39: The phase "phase" is set forward (i.e., inverted).

L41–L43: The data are transmitted to the left neighbor processor, and the flag RR[phase] of the left neighbor processor is turned into true.

L45–L47: The data are transmitted to the right neighbor processor, and the flag RL[phase] of the left neighbor processor is turned into true.

L49: The determination of the gloss sum of "dif" requested at L37 is awaited.

L69: The loop L23–L50 is repeated until the square sum of the errors becomes less than or equal to EPSILON.

EXAMPLE 3

In the conventional program shown in FIG. 25, in order to obtain the sum of the absolute values of the differences between the old and new values for the values of the array X, the values of the array X are escaped to the array Y once at the loop 10. Then, the sum of the absolute values of the differences is obtained in DIFF at the loop 30 later on.

In contrast, according to this first embodiment as described above, the description can be simplified as shown in FIG. 26. Here, X'(I) expresses the value of the immediately previous version of X(I). also, UPDATE(X) is a dummy command for commanding the version updating of the array X. In this example of FIG. 26, it is not just that the description for copying the array X to the array Y becomes unnecessary and in fact the operation of copying is not used at all, because the older values are remaining in the multifold buffers so that there is no need to copy anything.

Figure 27:
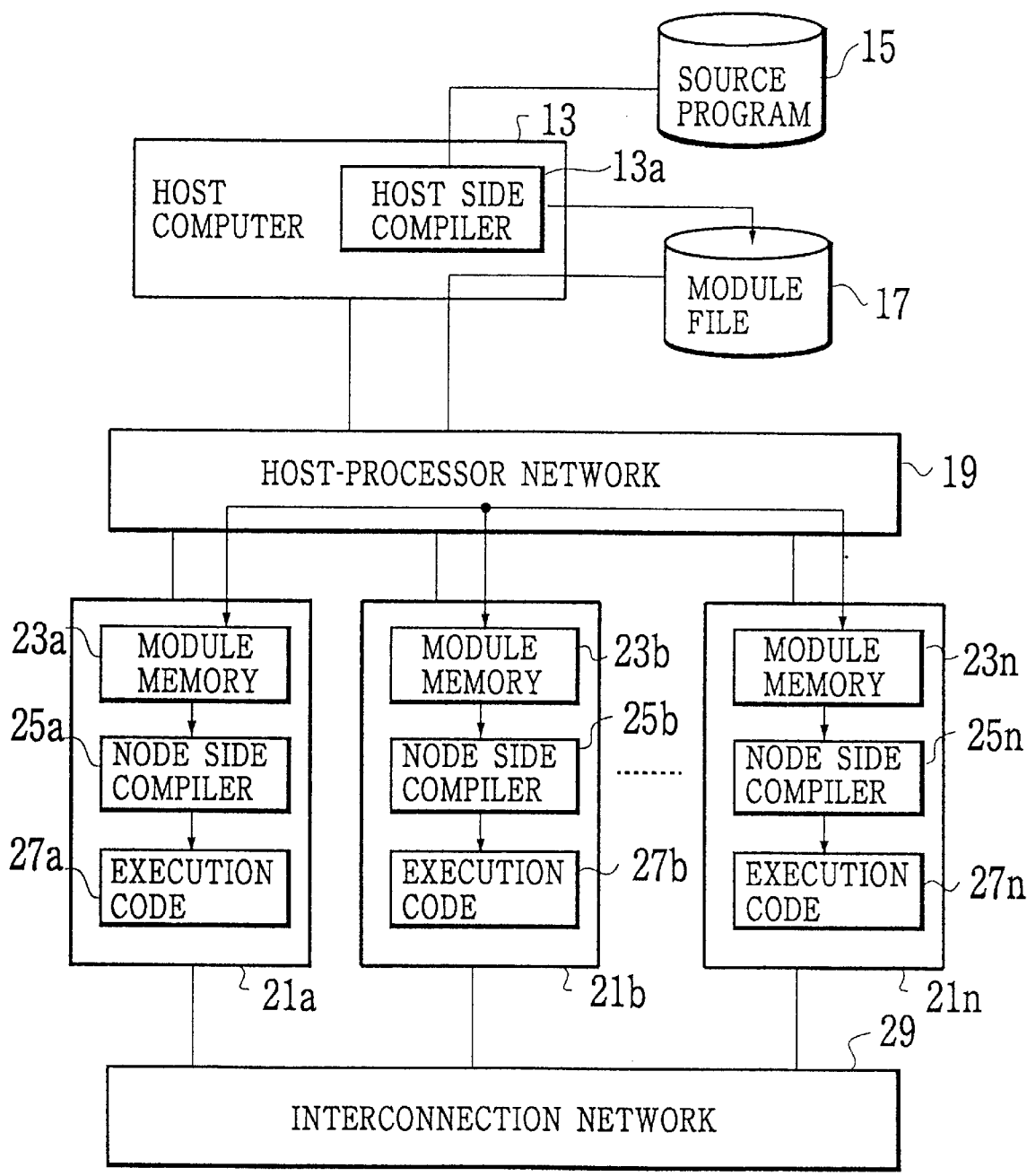
FIG. 27 is a block diagram of a second embodiment of a parallel processing system according to the present invention.

Referring now to FIG. 27, a second embodiment of the present invention concerning a compilation scheme for realizing an efficient program execution will be described in detail.

In short, the compilation scheme of this second embodiment concerns with a case of executing a program on a parallel processing system. In this compilation scheme, at a time of compiling the source program, for the parallelism independent portions of the program which are unrelated to a total number of processors for actually executing the program or a network topology of the processors, the usual compilation operation is carried out to obtain the object-codes capable of being linked with the other modules. On the other hand, for the parallelism dependent portions of the program which are dependent on a total number of processors for actually executing the program or a network topology of the processors, the intermediate-codes are generated and the generated intermediate-codes are loaded into the processors for actually executing the program. Then, at each processor, according to the information concerning the total number of the processors for actually executing the program and the network topology of the processors, the intermediate-codes are compiled into optimum codes. This compilation scheme will now be described in further detail.

In order to realize this compilation scheme, the parallel processing system in this second embodiment has a configuration as shown in FIG. 27, which comprises: a host computer 13 which is equipped with a host side compiler 13a for generating object-modules and intermediate-modules by compiling a source program 15; a module file 17 for storing the object-modules and intermediate-modules generated by the host side compiler 13a; a plurality of processors 21 (21a to 21n), each of which has a module memory 23 (23a to 23n), a node side compiler 25 (25a to 25n), and an object memory 27 (27a to 27n); a host-processor network 19 for connecting the processors 21 with the host computer 13 and the module file 17; and a processor network 29 for connecting the processors 21 with each other.

This major feature of this configuration of FIG. 27 is that the compiler is divided into the host side compiler 13a on the host computer 13 and the node side compilers 25 on the processors 21. The host side compiler 13a analyzes the source program 15, and compiles the parallelism independent portions unrelated to the control for the parallelism by the usual compiling scheme to obtain the object-modules capable of being linked with the other modules, while leaving the parallelism dependent portions containing the control codes due to the program conversion for the parallelism, as given in terms of the intermediate-codes.

Here, the parallelism dependent portions containing the control codes for the parallelism are those which contain the control codes that are dependent on a processor number. For example, such a portion typically specifies what to do when the processor is a particular one identified by a particular processor number. In the conventional program such as that shown in FIG. 9 the lines containing "Plocal" variables correspond to these parallelism dependent portions.

The locations of these parallelism dependent portions can be detected by the conventionally known technique. Namely, in the presently available parallel compiler, the parallel node programs are generated from the source program by generating codes including the control codes for the parallelism. In this second embodiment, the host side compiler 13a leaves these codes as they are, as the intermediate-codes. Then, the object-modules obtained from the parallelism independent portions and the intermediate-modules obtained from the parallelism dependent portions are stored as the intermediate-programs in the module file 17.

At a time of executing this program, first, the processors to execute this program are acquired. Then, the identical contents of the module file 17 are loaded into the module memory 23 of each acquired processor 21.

Next, at each processor 21, the intermediate-codes stored in the module memory 23 are optimally compiled by the node side compiler 25 to obtain the optimum codes, according to the information concerning the total number and the network topology of the processors. Then, the executable objects (execution codes) to be stored in the object memory 27 are generated from the obtained optimum codes by linking them with the other modules.

Here, the optimal compilation using the information concerning the total number and the network topology of the processors implies the inclusion of the partial evaluations using then available information such as that on its own processor number, a total number of acquired processors, etc. For example, when four processors are acquired and the program shown in FIR. 8 is going to be executed, after each processor obtains its own processor number "Plocal", the compilation operation is carried out at each processor according to the obtained "Plocal" value, as shown in FIGS. 28, 29, and 30, for "Plocal"=1, 2 or 3, and 4, respectively. In other words, the different processors are going to generate different codes by the operations of the respective node side compilers 25 in this second embodiment.

It is to be noted that the activation of the node side compiler 25 at each processor 21 may not necessarily be limited to just immediately after the loading of the program. Namely, the node side compiler 25 at each processor 21 can be re-activated after the execution of the program, such that the compilation operation can be carried out only after the environment for executing the program has established (e.g., the processors to execute the program have been determined), as the compilation and execution can be carried out in parallel according to this second embodiment.

In such a case, in order to carry out the compilation operation in a middle of the execution, there is a need to set up a criteria as to which portion is going to be compiled when. As for "which portion", it is set to be the intermediate-code portions (i.e., the portions in which the codes for the parallelism are inserted among the source codes). As for "when", there are two schemes including the eager evaluation (eager compilation) and the lazy evaluation (lazy compilation). The former is a scheme in which the execution codes are validated (re-compiled) or invalidated, whenever there is a change in a state of pseudo constants contained in the intermediate-codes or of variables extracted by the host side compiler 13a. The latter is a scheme for determining whether to compile the intermediate-codes only when the execution of the intermediate-code portion actually takes place, or to execute the intermediate-code portion by reusing the already compiled execution codes.

Next, the management of the variables having influences on the intermediate-codes in this second embodiment will be described in detail.

In short, in this second embodiment, the code which is added for the parallelism in the node program is going to be maintained as it is at each processor as the intermediate-code. Then, in order to indicate whether the variable appearing in this intermediate-code has been changed since the same code had been executed last time, there is provided either a flag for indicating the change of the variable related to the intermediate-code, or a time stamp for recording the changed time for each variable related to the intermediate-code. Also, there is provided a flag for indicating whether it is the first time to execute this intermediate-code or not, immediately before the execution of the intermediate-code portion. When either it is the first time to execute this intermediate-code, or the variable at the portion related to this intermediate-code has been changed since it had executed last time, this intermediate-code is executed after the variable of this intermediate-code is set to be constant and then the execution code for this intermediate-code is maintained, whereas when it is the second or further times to execute this intermediate-code and the variable related to this intermediate-code has not been changed since the last execution, the execution code used in the last execution is executed. This variable management scheme will now be described in further detail.

Namely, there are those variables with which the partial evaluation cannot be carried out as they are unknown variables before the program execution, but which can be set to be constants (i.e., their values become invariable from a certain point on) by the program execution. In such a case, the partial evaluation with these variables becomes possible after the program execution, so that they can be compiled into the codes with high execution efficiency. Here, however, even if they are set to be constants, if they are to be compiled every time, the processing efficiency is not going to be much different from a case of executing the codes of the low execution efficiency for which the same calculation must be carried out every time. In other words, the compilation should be carried out only when the variables have actually changed. To this end, there is a need to know the change of the variables.

In this regard, there are two possible schemes. One is to provide a flag for each variable in order to indicate whether that variable has been changed or not. When a certain intermediate-code in a certain routine is re-compiled, this flag is turned into true, and thereafter the flag is turned into false whenever that variable is changed. In a case of re-executing that routine, if the flag indicates true, the routine can be executed as it is, while that routine is re-compiled when the flag indicates false.

Another is a scheme to make each variable to carry a version number. In this case, every time the value is updated the variable increases the version number. At a time of re-compiling a certain routine, the version of the variable used at that time is memorized. Then, at a time of executing that routine, whether the version used in the re-compiling of that routine has been changed from the last time or not is checked, and if it is the same, that routine is executed as it is, whereas if it has been changed, that routine is executed after being re-compiled.

Here, an exemplary program shown in FIG. 31, which is obtained by modifying the conventional program of FIGS. 5A, 5B, 6A, and 6B according to this second embodiment, will be described. In this program of FIG. 31, A(I)=I is carried out for each array A from a lower bound M1 to an upper bound M2, just as in the conventional case. Here, however, unlike the conventional case in which the variables M1 and M2 remain fixed after they are set up, the variables M1 and M2 are going to vary in time in this program of FIG. 31. In this case, those between L7: META-CODE BEGIN and L14: META-CODE END are specified as the intermediate-codes. This specification of the intermediate-codes are added by the host side computer 13a. When stored in the module file 17, these intermediate-codes between L7 and L14 are left as they are, while those between L16 and L19 are given in a form of a linkable module (assembler or relocatable format). In a case of executing this program at each processor 21, when it comes to this subroutine PEX, the conditions of whether it is the first time this subroutine is executed, and whether the values of the variables MYPE, M1, and M2 in the list specified at L8 have been updated are checked. Then, only when either one of these conditions is satisfied, L7 to L14 are compiled to the executable codes and then executed. In a case both of these conditions are not satisfied (which is usually the case), the execution codes used at the last execution are reused. Note that the list specified at L8 are the list of variables to be looked up at L7 to L14, and it can be automatically generated at the host side compiler 13a by syntactically analyzing the source program 15.

It is to be noted that it is necessary for the time cost of the re-compilation to be equivalent to that of the usual calculation using the variables set to be constants as variables. In such a case, the execution performance is at least equivalent to the conventional scheme even when the re-compilation takes place every time. In general, a number of routines to be executed with the same values as before is expected to be large, so that the execution performance can be improved.

Next, the introduction of the pseudo constant that can be set to be constant/variable in this second embodiment will be described in detail.

In short, in this second embodiment, the symbol used in the program has the attribute of variable, constant, or pseudo constant, of which the pseudo constant is a symbol which can be specified to be constant/variable in the program. When it is specified to be constant, its value is not allowed to change until it is specified to be variable next, and if its value is changed, the execution error for the memory protection exception is cause. This pseudo constant will now be described in detail.

In general, the program contains values in forms of the variables and the constants. In addition, in this second embodiment, a type of value called pseudo constant is introduced. This pseudo constant can be either explicitly declared as the pseudo constant by attaching the pseudo attribute as indicated in FIG. 32A, or implicitly declared in the same manner as the normal variables as indicated in FIG. 32B. In a case of the latter, the pseudo constant can be distinguishably recognized by the later appearance of FREEZE command for specifying it to be constant or MELT command for specifying it to be variable. Here, the programmer is held responsible for attaching the pseudo attribute or describing FREEZE and MELT commands in the program.

Using such pseudo constants, the program corresponding to that of FIG. 31 can be obtained as shown in FIG. 33. Here, it is assumed that the pseudo constants are in variable state (a state capable of changing its value) initially at a beginning of the program. In this program of FIG. 33, at the subroutine INITIALIZE (L1 to L8), the own processor number is substituted into MYPE at L2, and this MYPE is set to be constant at L3. Similarly, the values of M1 and M2 are determined at L4 and L5, and these M1 and M2 are set to be constants at L6.

In the operation to set the pseudo constant to be constant, two things are done as follows. One thing to be done is the optimization in conjunction with the setting of the pseudo constant to be constant. In a case of FIG. 33, N1 and N2 are calculated at L22 to L25, and these calculations need not be executed every time the subroutine PEX is executed, but either when the pseudo constant is set to be constant, or when the value of the pseudo constant is different at the subroutine PEX from the previous time.

Another ting to be done is the protection of the pseudo constant. Namely, when the pseudo constant is set to be constant, in order to prohibit the writing with respect to the pseudo constant, it is necessary to specify the writing prohibition for the pseudo constant. This can be achieved in cooperation with the OS by setting the writing prohibition to the page of the memory containing the specified pseudo constant. On the other hand, when the pseudo constant is set to be variable, in order to permit the writing with respect to the pseudo constant, it is necessary to specify the writing permission for the pseudo constant. This can be achieved in cooperation with the OS by setting the writing permission to the page of the memory containing the specified pseudo constant. In this regard, it is preferable to allocate all the pseudo constants to be set to be constants/variables together on the identical page of the memory.

When the change of the value of the pseudo constant set to be constant is attempted in the program, the execution error is going to be caused. For example, in the subroutine REINIT (L9 to L16), the values of the pseudo constants M1 and M2 are going to be changed at L11 and L12, but these pseudo constants are set to be variable by the MELT command at L10 before their values are changed. If this MELT command is missing, the error is caused. Of course, in a case such an erroneous data write can be detected statically by the compiler, the compile error is caused to notify the programmer, but the execution error is caused instead when such a static detection of the erroneous data write is impossible.

Here, in order to set all the pseudo constants to be constants/variables together, it is also possible to use FREEZE() command and MELT() command without specified arguments as shown in FIG. 34. In this manner, all the pseudo constants can be managed together on the same page of the memory, and it becomes easier to recognize whether the intermediate-code is to be compiled or not, or to be invalidated or not, so that the implementation efficiency can be improved.

Next, the relationship between the pseudo constants and the intermediate-codes in this second embodiment will be described in detail.

In short, in this second embodiment, in order to decide the timing to ascertain (i.e., to optimally compile) the intermediate-codes, and the timing to invalidate the compiled execution codes, it is necessary to know whether the values of the pseudo constants which influence the ascertaining of that intermediate-codes have been changed or not. To this end, there is provided a list of the pseudo constants necessary for compiling the intermediate-codes, and when some pseudo constants are set to be constants, if there are any intermediate-codes that can be ascertained by this setting of the pseudo constants to be constants, these intermediate-codes are ascertained (i.e., optimally compiled), while the execution codes for the already ascertained intermediate-codes containing these pseudo constants are invalidated.

Namely, when there is a pseudo constant and a command specifying this pseudo constant to be constant is given, the compilation of the intermediate-codes is initiated. Here, when this is a intermediate-code which contains two pseudo constants and only one of these pseudo constants is set to be constant, this fact is memorized but the compilation of this intermediate-code is not carried until the other one of these pseudo constants is also set to be constant. Also, when this intermediate-code is already compiled and only one of these pseudo constant is set to be variable, the compiled execution code is invalidated. Also, when there is a need to execute this intermediate-code before all the pseudo constants are set to be constants, this intermediate-code is compiled immediately before the execution, and then after the execution, the execution code is invalidated.

Next, the eager evaluation of the intermediate-code in this second embodiment will be described in detail.

In short, when the pseudo constant is set to be constant, the intermediate-codes related to that pseudo constant are optimally compiled, and when this pseudo constant is set to be variable, the optimally compiled execution codes for the intermediate-codes related to that pseudo constant are invalidated.

Namely, the execution code which had been compiled according to the partial evaluation on the processor is valid only while the pseudo constants involved in this partial evaluation are unchanged. Therefore, when the values of these pseudo constants are updated, there is a need to invalidate the execution code which had been optimally compiled according to the partial evaluation. Regardless of whether the codes are actually going to be used or not, when the provision to validate (re-compile) or invalidate the execution codes whenever the state of the pseudo constants changes is adopted, it can be said that it is the eager evaluation (eager compilation).

Next, the lazy evaluation of the intermediate-code in this second embodiment will be described in detail.

In short, immediately before the execution of the intermediate-code, when it is the first time to execute this intermediate-code, or when the variable at the portion related to this intermediate-code has been changed since it had executed last time, this intermediate-code is executed after the variable of this intermediate-code is set to be constant and then the execution code for this intermediate-code is maintained, whereas when it is the second or further times to execute this intermediate-code and the variable related to this intermediate-code has not been changed since the last execution, the execution code used in the last execution is executed.

In this case, in contrast to the case of the eager evaluation described above, whether the execution code is valid or not is checked when this execution code is actually going to be executed, and this execution code is executed as it is when it is valid, whereas the execution is carried out after a new execution code is obtained by the re-compilation when it is invalid. In this case, it can be said that it is the lazy evaluation (lazy compilation) in comparison to the eager evaluation described above.

Now, two exemplary cases for the application of the second embodiment described above will be illustrated in detail.

EXAMPLE 4

This example concerns with a speeding up of the access to the distributed shared memory, in which the compilation is carried out basically before the execution.

Figure 35:
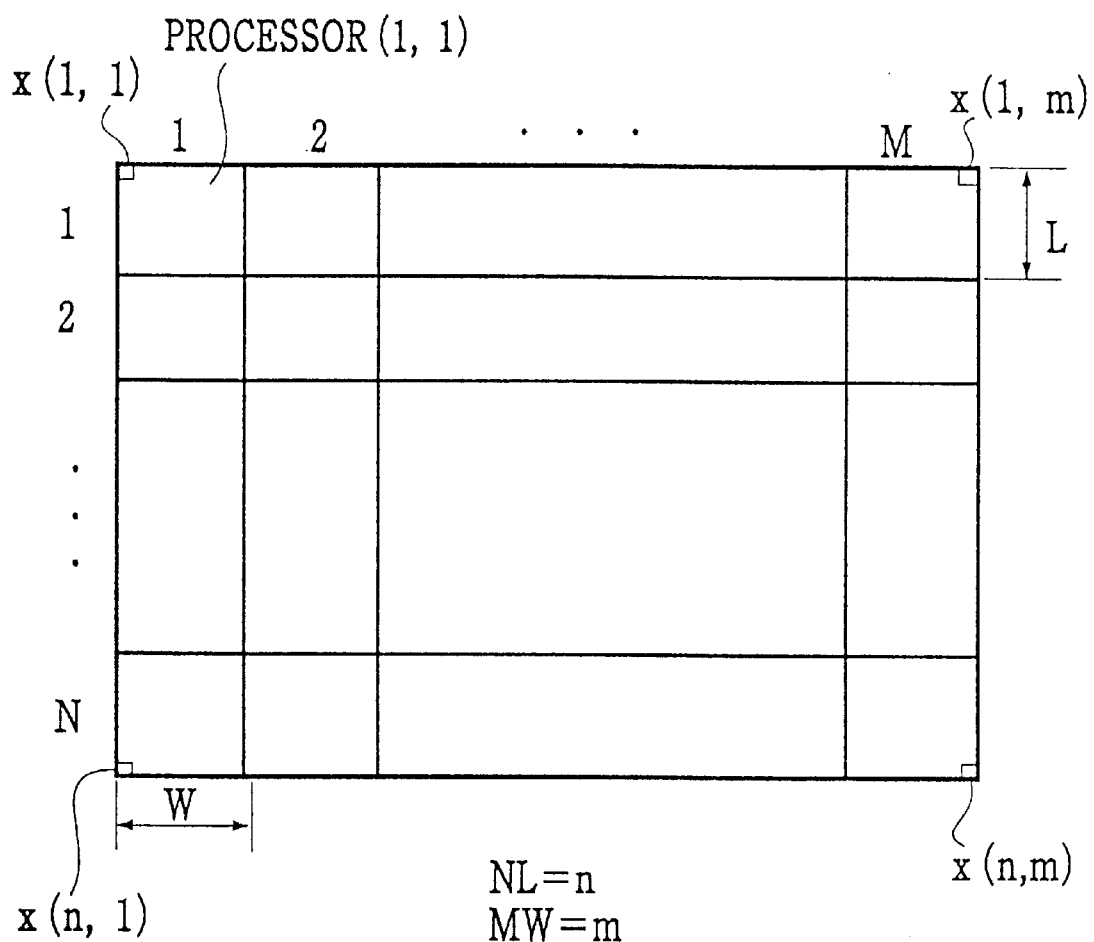
FIG. 35 is a schematic illustration of a configuration of processors and their assignment to an array used in one example of the application of the second embodiment.

In this example, the two-dimensional array x(n, m) is arranged and executed on the parallel processing system having the distributed shared memories connected in two-dimensional mesh, where this array x(n, m) contains n×m elements x(1, 1) to x(n, m) and n and m are constants. The parallel processing system has N×M processors for executing the program which are connected in two-dimensional mesh as indicated in FIG. 35.

Here, the array element x(j, i) is located at an address PX(((j−1)%L)+1), ((i−1)%L)+1) of an inner processor array PX in a processor (((j−1)/L)+1), ((i−1)/W)+1), where L=n/N, W=m/M, and % denotes the residue. For simplicity, it is assumed that n is divisible by N and m is divisible by M).

In a case of n=1000 and m=500 for example, the values of N and M are unknown at a time of the static compilation while the values of L and W are also unknown in the conventional scheme. For this reason, in order to make an access to the data x(123, 71), it has been necessary in the conventional scheme to generate the code for making an access to a partial array PX((122%L)+1, (70%W)+1) in a processor ((122/L)+1, (70/W)+1). This calculation includes the division twice, so that its execution efficiency is low.

In contrast, according to the second embodiment described above, the partial evaluation is carried out according to the total number of processors and their configuration (N, M) at a time of the execution start. In this case, at a point at which the values of N and M are ascertained, the values of L and W are also ascertained (they are going to be L=10 and W=5), so that the highly efficient code can be generated. For example, in order to make an access to the data x(123, 71), it suffices to make an access to a partial array PX((122%10)+1, (70%5)+1)=PX(3, 1) of a processor ((122/10)+1, (70/5)+1)=(13, 15). Moreover, it suffices to carry out this address calculation (compilation) only once before the program execution after the processor acquisition. In the subsequent executions, this highly efficient code which has been set to be constant can be utilized.

Apart from such a case of making an access to the value of the specific data such as x(123, 71), the similar improvement of the efficiency can also be achieved often in a case of making an access to an array element in a loop.

For example, the overall program as shown in FIG. 36A will appear as shown in FIG. 36B for each processor, where PEY and PEX represent the two-dimensional identifier (PEY, PEX) of the processor assigned to this program of FIG. 36B. In the partial array, the starting point is different from the original program, so that this deviation is corrected by OFFSET in the program of FIG. 36B.

Also, for the variable px(j, i) appearing in the program of FIG. 36B, if the normal implementation to secure the partial array px in a continuous address region is adopted and this partial array px is handled by a vector processing; it suffices to know the address of the top element px(1, 1) in this partial array px at a high speed.

This element px(1, 1) does not involve any variable, so that the highly efficient access can be made similarly to the case of the access to the data x(123, 71) described above. Even when the vector processing is not used, in a case of the loop processing in FIG. 36B, the array elements to be operated can be enumerated. The fact that they can be enumerated implies that the concrete array element can be specified, so that the highly efficient code can be generated in such a case.

EXAMPLE 5

This example concerns with a high speed processing of the codes including the pseudo constants, in which the execution and the compilation progress in parallel.

In this example, a case of the parallel execution of the source code shown in FIG. 37 for copying array elements between M and N from an array A to the array B will be considered.

Figure 39A:
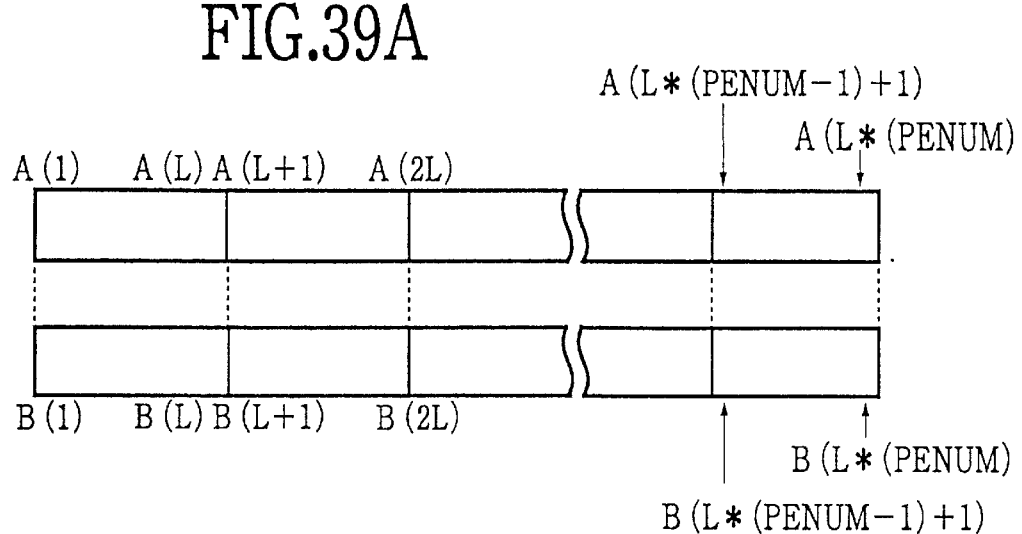
FIGS. 39A and 39B are diagrammatic illustrations of distributed assignments of an array of the program of FIG. 38 to processors.

Here the parallel processing system has a plurality of processors, and a total number PENUM of the processors that can be actually used for the execution is assumed to be unknown until the time of the execution. In addition, the array A and the array B are assumed to be arranged by being evenly divided over PENUM processors, as indicated in FIG. 39A.

Here, the problem is how to know which elements assigned to which processors are going to be the starting point M and the ending point N of the loop. Conversely, from the point of view of each processor, it is the problem of how to know the range of the array assigned to each processor for repeating calculation, at a high efficiency.

Figure 39B:
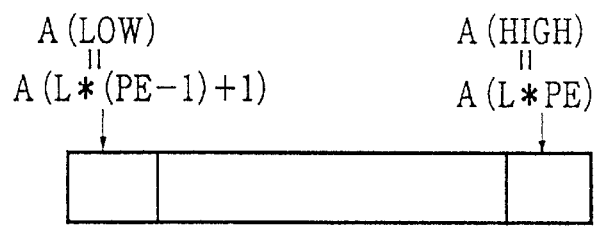

For example, a parallel version of the source program of FIG. 37 can be described as the source program shown in FIG. 38. In this program of FIG. 38, the own processor number is PE (where PE is a natural number within a range of 1 to PENUM), and a number of elements in the array assigned to each processor is set to be L. In this case, the array assigned to the processor PE comprises elements from an element LOW=(L*(PE−1)+1) to an element HIGH=L*PE as indicated in FIG. 39B.

Then, the range MX to NX for the repeat at some processor can be obtained by taking the range N to M for the suffix of the repeat into consideration. The obtained range can be understood by considering the following six cases which are also depicted in FIG. 40.

CASE (1) MX=LOW, NX=N→MX>NX
CASE (2) MX=LOW, NX=N→LOW to N
CASE (3) MX=LOW, NX=HIGH→LOW to HIGH
CASE (4) MX=M, NX=N→M to N
CASE (5) MX=M, NX=HIGH→M to HIGH
CASE (6) MX=M, NX=HIGH→MX>NX where MX>NX in case of not executing the loop L7 to L8 in FIG. 38. The actual copying operation for the arrays are carried out by the actual calculation at this loop L7 to L8.

This FIG. 38 shows one possible way of describing this program, but it is rather inefficient to execute this program of FIG. 38 directly, just like the conventional scheme. Namely, at a time of the execution, i.e., when the processes are allocated to the processors, the values of PE and PENUM are determined, and when the regions for the arrays A and B are acquired, the value of L is also determined. In other words, at a point the values of M and N are determined, the values of MX and NX can be ascertained. Yet, the program of FIG. 38 repeats the calculation of MX and NX every time the DO loop is carried out, so that it is rather inefficient in this respect.

Figure 40:
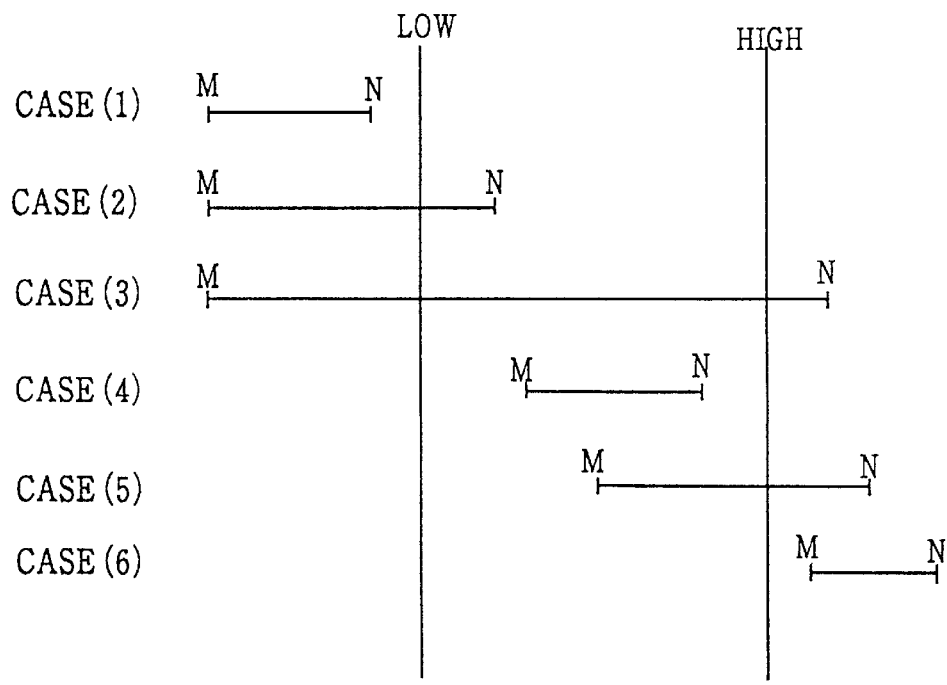
FIG. 40 is an illustration of case settings used in another example of the application of the second embodiment.

This inefficiency of the program of FIG. 38 can be compensated by using the execution codes according to the six cases separated in FIG. 40, so as to realize the highly efficient program. Namely, for a certain processor, LOW and HIGH are ascertained, and the six cases of FIG. 40 can be described in terms of program language as shown in FIG. 41. Furthermore, while FIG. 35 are described in terms of the whole arrays A and B, this can be rewritten in terms of the partial arrays PA and PB assigned to each processor as shown in FIG. 42. Here, each partial array has elements numbered 1 to L.

With these preparations, when the original source program of FIG. 37 is compiled according to this second embodiment, the host side compiler 13a generates the codes shown in FIG. 43 as the intermediate-codes. Here, in FIG. 43, the codes are given under the subroutine called FOO() at L1 for convenience, and this subroutine itself comprises the intermediate-codes given at L2 to L37. At L2, the parameters for determining the intermediate-codes are declared as N, M, L and PE.

This subroutine FOO is compiled at a time of the execution according to the information on the setting of the pseudo constants to be constants. In a case of this subroutine FOO, what is actually executed at each processor is one of the six cases (1) to (6), and the conditional sentence to judge which one of these six cases (1) to (6) is to be executed at each processor has already been handled at a time of the compilation by the node side compiler at each processor, so that the highly efficient execution can be realized.

Namely, for the program as a whole, an initialization routine as shown in FIG. 44 is going to be executed in advance. In this initialization routine of FIG. 44, the own processor number PE is taken out from the function MYPENUM() at L2, and then this PE is set to be constant at L3. Then, the size L of the arrays PA and PB at the own processor is entered at L4, and then this L is set to be constant. Then, the regions for the arrays PA and PB are actually secured at L6 and L7, and these arrays are initialized by the "read" sentence at L8 and L9.

Next, the mechanism for compiling the intermediate-code will be described. At META-CODE of L2, the constant setting table shown in FIG. 45 is set up for the pseudo constants N, M, L, and PE the declared at META-CODE of L2 with respect to the FREEZE and MELT commands.

Figures 45, 46:
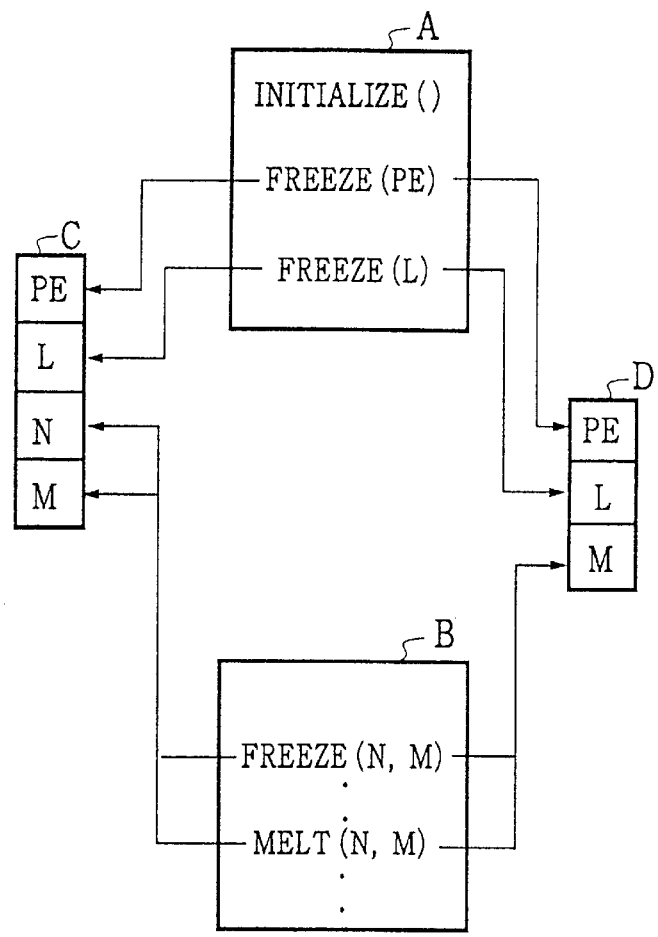
FIG. 45 is a diagrammatic illustration of a table for pseudo constants used in the meta-codes of FIG. 43.

Namely, in the initial state, all the elements of this table of FIG. 45 are false. When the pseudo constant is set to be constant, the corresponding element on this table of FIG. 45 is turned into true, while the pseudo constant is set to be variable, the corresponding element on this table of FIG. 45 is turned into false. Then, when all the elements in this table become true, the intermediate-codes are compiled, whereas when at least one of the elements in this table becomes false, the already compiled intermediate-codes are invalidated.

In this table of FIG. 45, an area A enlists the codes in the program of FIG. 44, while an area B enlists the codes in the program of FIG. 46 described below. Also, an area C is a table for the pseudo constants in the program of FIG. 43 while an area D is a table for the pseudo constants in another program.

In this program of FIG. 44, after the processes are allocated to the processors and the execution has started, the value of PE and L are going to be invariable once they are set. On the other hand, N and M specify the array element to be the operation target, so that their values can be changed as the program progresses. In such a case, the subroutine FOO() of FIG. 43 is going to be re-compiled by the above described mechanism.

Now, these programs of FIGS. 43 and 44 can be executed in an exemplary execution program shown in FIG. 46. First, the initialization routine INITIALIZE() of FIG. 44 is called. Then, the values of the pseudo constants N and M are determined at L2 and L3, and then they are set to be constants at L4. At this point, the pseudo constants N, M, L, and PE for the subroutine FOO() of FIG. 43 are all ascertained, so that the subroutine FOO() is compiled by using the partial evaluation and then the subroutine FOO() is executed at L5. Then, if the values of the pseudo constants N, M, L, and PE are unchanged until the next execution of the subroutine FOO() at L7, this subroutine FOO() is executed at L7 by reusing the execution codes used at the last execution at L5. After that, when the pseudo constants N and M are set to be variables at L9, this subroutine FOO() is re-compiled before the subroutine FOO() is executed once again at L10.

In the initial state, i.e., at a beginning of the program, the pseudo constants can be in either one of the constant state or variable state, as long as they can be specified to either one of these states in the program. However, the pseudo constants are usually used as the constants after the first values are substituted, so that it can be expected that the programming becomes easier by using the default setting to set the pseudo constants to be in the variable state initially.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A distributed shared-memory parallel processing system, comprising:

data dependency analysis means for analyzing a program to be executed in parallel in the system so as to obtain data dependency of each operation in the program; and a plurality of processors for executing the program in parallel, which are connected with each other and with the data dependency analysis means through a network and sharing a distributed shared memory, each processor having a distributed part of the distributed shared memory;

wherein the data dependency analysis means determines which of said plurality of processors will need data stored at any one of said plurality of processors and said any one of said plurality of processors transmits the data needed by another processor to said another processor based on the determination made by said data dependency analysis means before said another processor actually requires the data; and the distribution part of the distributed shared memory in each processor includes a data storage region for receiving transmitted data from other processors, the data storage region including multi-fold storage areas for each data.

2. The system of claim 1, wherein each processor writes each transmitted data into one of the multi-fold storage areas for said data in each of said those processors cyclically.

3. The system of claim 1, wherein the multi-fold storage areas for each data represent versions for each data which are distinguishably accessible from a program executed by the system.

4. The system of claim 1, wherein each processor has a write flag for allowing a data write to each data allocated to the distributed part of the distributed shared memory in said each processor, and a read flag for allowing a data read for each transmitted data.

5. The system of claim 4, wherein the write flag for each data in each processor is turned into true by another processor when the data read for said each data which have been transmitted from said each processor to said another processor is carried out by said another processor.

6. The system of claim 4, wherein the write flag for each data in each processor is turned into false by said each processor when the data write for said each data is carried out by transmitting said each data from said each processor to another processor.

7. The system of claim 4, wherein the read flag for each data in each processor is turned into true by another processor when the data write for said each data is carried out by transmitting said each data from said another processor to said each processor.

8. The system of claim 4, wherein the read flag for such data in each processor is turned into false by said each processor when the data read for said each data is carried out by said each processor.

9. A parallel processing system comprising:
a host computer having a host side compiler for compiling a program to be executed in the system, such that parallel processing independent portions of the program are compiled up to object-codes linkable to other modules, while leaving parallel processing dependent portions of the program as intermediate-codes; and
a plurality of processors for executing the program in parallel, which are connected with the host computer through a network, each processor having a node side compiler for optimally compiling the object-codes and the intermediate-codes obtained by the host side compiler to obtain optimum execution codes to be executed at said each processor according to information concerning parallelism.

10. The system of claim 9, wherein the parallel processing independent portions compiled up to the object-codes by the host side compiler are portions unrelated to a total number and a network topology of processors for actually executing the program, while the parallel processing dependent portions left as the intermediate-codes by the host side compiler are portions other than the parallel processing independent portions.

11. The system of claim 9, wherein the node side compiler compiles the intermediate-codes according to the information concerning parallelism which specifies a total number and a network topology of the processors for actually executing the program.

12. The system of claim 9, wherein the node side compiler optimally compiles the intermediate-codes by utilizing partial evaluations based on the information concerning the parallelism.

13. The system of claim 9, wherein the optimum execution codes obtained by the node side compiler of any one of said processors are different from those obtained by the node side compiler of others of said processors.

14. The system of claim 9, wherein the node side compiler compiles such intermediate-code containing a variable by setting the variable to be constant to obtain execution code for said each intermediate-code, when it is a first time to execute said each intermediate-code or when a value of the variable has been changed since said each intermediate-code had been executed last time, and each processor maintains the obtained execution code for said each intermediate-code, such that when it is not the first time to execute said each intermediate-code and the value of the variable has not been changed since said each intermediate-code had been executed last time, the execution code for said each intermediate-code maintained by each processor is executed.

15. The system of claim 9, wherein the program contains a pseudo constant which can be set to be constant/variable from a program executed by the system, and the node side compiler optimally compiles each intermediate-code related to the pseudo constants to obtain the optimum execution code when all the pseudo constants related to said each intermediate-code are set to be constants, and invalidates already compiled optimal execution code when any one of the pseudo constants related to said each intermediate-code is set to be variable.

16. The system of claim 9, wherein the program contains a pseudo constant which can be set to be constant/variable from a program executed by the system, and while the pseudo constant is set to be variable, the node side compiler optimally compiles each intermediate-code related to the pseudo constant to obtain the optimum execution code immediately before said each intermediate-code is executed, and invalidates the executed optimum execution code immediately after said each intermediate-code is executed.

17. A method of parallel processing by a parallel processing system including a plurality of processors connected with each other through a network and sharing a distributed shared memory, each processor having a distributed part of the distributed shared memory, the method comprising the steps of:
analyzing a program to be executed in parallel in the system so as to determine data dependency of each operation in the program by determining which of said plurality of processors will need data stored at any one of said plurality of processors; and
transmitting the data needed by another processor from said any one of said plurality of processors based on the analyzing step before said another processor actually requires the data to a data storage region for receiving transmitted data that is provided in the distributed part of the distributed shared memory in said another processor, wherein the data storage region includes multi-fold storage areas for each data.

18. A method of parallel processing by a parallel processing system including a host computer having a host side compiler and a plurality of processors connected with the host computer through a network, each processor having a node side compiler, the method comprising the step of:
compiling a program to be executed in the system at the host side compiler such that parallel processing independent portions of the program are compiled up to object-codes linkable to other modules, while leaving parallel processing dependent portions of the program as intermediate-codes;
optimally compiling the object-codes and the intermediate-codes obtained by the host side compiler at the node side compiler of each processor to obtain optimum execution codes according to information concerning parallelism; and
executing the program by using the object-codes obtained by the host side compiler and the optimum execution code obtained by the node side compiler.

* * * * *